United States Patent
Iwahara et al.

(10) Patent No.: US 11,052,838 B2
(45) Date of Patent: *Jul. 6, 2021

(54) ENGAGING MEMBER

(71) Applicant: DAIWA KASEI INDUSTRY CO., LTD., Okazaki (JP)

(72) Inventors: Toshio Iwahara, Okazaki (JP); Makoto Kato, Okazaki (JP); Katsuya Hirakawa, Okazaki (JP)

(73) Assignees: DAIWA KASEI INDUSTRY CO., LTD., Okazaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,960

(22) Filed: Dec. 19, 2019

(65) Prior Publication Data
US 2020/0207291 A1    Jul. 2, 2020

(30) Foreign Application Priority Data
Dec. 28, 2018 (JP) .............................. JP2018-246465

(51) Int. Cl.
*B60R 16/02*    (2006.01)
*H02G 3/04*    (2006.01)

(52) U.S. Cl.
CPC ....... *B60R 16/0215* (2013.01); *H02G 3/0456* (2013.01)

(58) Field of Classification Search
CPC .............. Y10T 24/1498; H02G 3/0456; B60R 16/0215; F16L 3/233
(Continued)

(56) References Cited

U.S. PATENT DOCUMENTS 3,149,808 A  *  9/1964  Weckesser .............. F16L 3/233
                                                    248/74.3
3,906,593 A     9/1975  Caveney et al.
                   (Continued)

FOREIGN PATENT DOCUMENTS

CN      205062495 U    3/2016
JP      2007-282352 A  10/2007

OTHER PUBLICATIONS

Non-Final Office Action dated Jun. 26, 2020, issued in U.S. Appl. No. 16/721,018.
(Continued)

*Primary Examiner* — Bradley Duckworth
(74) *Attorney, Agent, or Firm* — McClure, Qualey & Rodack, LLP

(57) ABSTRACT

An engaging member is formed by a binding member and a body member separate from the binding member being combined. The binding member has a belt portion that winds around an outer periphery of a wire routing material, and a buckle portion capable of fixing both ends of the belt portion. The body member includes, as an engaging portion for assembly into a vehicle body, a pillar portion to be inserted in a fixing hole of the vehicle body, and an elastic latch piece that is inserted, together with the pillar portion, in the fixing hole, is elastically deformed so as to approach the pillar portion when inserted, is elastically restored in the inserted state, is latched by and against a peripheral portion of the fixing hole. The pillar portion has a buckle storing portion in which the buckle portion is stored.

4 Claims, 22 Drawing Sheets

(58) Field of Classification Search
USPC .......................................................... 248/74.4
See application file for complete search history.

(56) References Cited

U.S. PATENT DOCUMENTS

| | | | | |
|---|---|---|---|---|
| 4,705,245 | A * | 11/1987 | Osada | F16L 3/233 |
| | | | | 24/16 PB |
| 6,049,949 | A | 4/2000 | Guthke | |
| 6,764,050 | B2 * | 7/2004 | Takenaga | B60R 16/0215 |
| | | | | 24/16 PB |
| 6,854,693 | B2 * | 2/2005 | Harrison | H02G 3/32 |
| | | | | 24/16 PB |
| 9,669,770 | B1 * | 6/2017 | Schlaupitz | H02G 3/32 |
| 9,908,486 | B2 * | 3/2018 | Suzuki | H01B 13/01209 |
| 9,970,573 | B2 * | 5/2018 | Beyer | B65D 63/1027 |
| 2006/0192059 | A1 * | 8/2006 | Morello | F16L 3/16 |
| | | | | 248/74.3 |
| 2010/0186197 | A1 * | 7/2010 | Inomata | F16L 3/233 |
| | | | | 24/16 R |
| 2019/0218006 | A1 * | 7/2019 | Matz | F16B 2/08 |

OTHER PUBLICATIONS

Chinese language office action dated Nov. 26, 2020, issued in application No. CN 201911344360.2.
English language translation of office action.
Final Office Action dated Dec. 28, 2020, issued in U.S. Appl. No. 16/721,018.

* cited by examiner

ENGAGING MEMBER

RELATED APPLICATIONS

This application claims the priority of Japanese Patent Application No. 2018-246465 filed on Dec. 28, 2018. The disclosure of the prior application is hereby incorporated herein in the entirety by reference.

BACKGROUND OF THE INVENTION

Field of the Invention

This invention relates to an engaging member.

Description of Related Art

For vehicles, a belt clamp (engaging member) described in, for example, Japanese Laid-Open Patent Publication No. 2007-282352 is used to hold a wire harness formed by a wiring group including a signal line and a power supply line, in a binding state, in a vehicle body.

In recent years, development of an automatic binding device for automatically binding a wire routing material such as a wire harness by using such a belt clamp, has been considered. However, the belt clamp is integrated with an engaging portion for assembly into a vehicle body, and various shapes are used for the engaging portions. In the automatic binding device, a belt is bound in a state where the engaging portion is stored and held. However, all kinds of the engaging portions having various shapes are difficult to stably store and hold.

An object of this invention is to provide an engaging member, for binding a wire routing material, which has a structure that can be easily applied to a device for automatically binding the wire routing material.

SUMMARY OF THE INVENTION

In order to solve the aforementioned problem, an engaging member of this invention includes: a binding member having a belt portion that winds around an outer periphery of an elongated wire routing material, and a buckle portion capable of receiving the belt portion from a leading end thereof and fixing the belt portion; and a body member that is separate from the binding member, the body member including an engaging portion that has a pillar portion to be inserted in a fixing hole of a vehicle body for assembly into the vehicle body, and an elastic latch piece that is inserted, together with the pillar portion, in the fixing hole, is elastically deformed so as to approach the pillar portion when inserted, is elastically restored in the inserted state, is latched by and against a peripheral portion of the fixing hole in a direction opposite to an insertion direction, and enter a detachment preventing state. The pillar portion has a buckle storing portion into which the buckle portion can be stored and combined.

According to this invention, the binding member for binding a wire routing material such as a wire harness with the belt portion is disposed separately from the body member having the engaging portion. The binding member has the buckle portion for fixing both ends of the belt portion, and can be combined with the body member having the engaging portion. The buckle portion has a simpler shape (for example, rectangular parallelepiped) than the engaging portion, and the shape of the buckle portion need not be changed according to, for example, a fixing portion (for example, fixing hole) of a vehicle body. Therefore, the buckle portion can be easily stored and held by a dedicated device. Thereafter, the dedicated device is used to perform automatic binding for the belt portion of the binding member, and the body member having the engaging portion compatible with a vehicle body is merely combined with the binding member, thereby easily forming the engaging member in a binding state. The pillar portion of the engaging portion acts as a support for supporting the entirety of the engaging member, and has a high stiffness. Therefore, when the buckle portion is combined with this portion, a stably combined state can be obtained. A conventional engaging portion has a recess or a hole in the pillar portion to form a hollow portion, thereby saving a resin material. According to this invention, a space that serves as the storage portion can replace such a hollow portion. Furthermore, according to this invention, the buckle storing portion is not separately formed so as to be disposed immediately below the engaging portion, and the buckle storing portion is formed in the pillar portion of the engaging portion. Thus, the height of the engaging portion can be reduced and the entirety of the engaging member can be downsized.

According to this invention, the buckle storing portion may store the buckle portion which has been inserted in the insertion direction from a lower surface of the pillar portion. In this configuration, a storing space that forms the buckle storing portion can be assuredly widened in the length direction of the pillar portion, to stably store and combine the buckle portion.

According to this invention, the buckle portion may have a belt insertion portion through which the belt portion is inserted, and the buckle storing portion may have a main storing portion for storing the buckle portion, and a projection end storing portion capable of storing a leading end, of the belt portion, which has been inserted through the belt insertion portion of the buckle portion toward a depth side in a storing direction, and projects. In this configuration, in the buckle storing portion that is formed in the pillar portion in the pillar portion extending direction, not only the buckle portion but also the belt portion leading end which has been inserted through the buckle portion and projects can be stored. In the belt portion having been inserted through the buckle portion, the projection is cut. The corner edge of the cut surface is dangerous, and the corner edge can be hidden in the buckle storing portion to assure safety.

According to this invention, the buckle portion may be shaped as a quadrangular prism so as to have a belt insertion portion through which the belt portion is inserted, and the buckle portion may have a buckle-side engaging portion on an outer surface other than surfaces in which an insertion inlet and an insertion outlet of the belt insertion portion are formed. The buckle storing portion may have, on an inner wall surface, a storage-side engaging portion that engages with the buckle-side engaging portion of the buckle portion. In this configuration, the outer peripheral surface of the buckle portion is engaged with an inner wall of the buckle storing portion formed in the pillar portion to stabilize the combination. When the inner wall surface of the buckle storing portion has a recess to form the storage-side engaging portion, the recess can also serve as the hollow portion described above.

DESCRIPTION OF THE PREFERRED EMBODIMENTS

A first embodiment of this invention will be described below with reference to the drawings.

Figure 12:
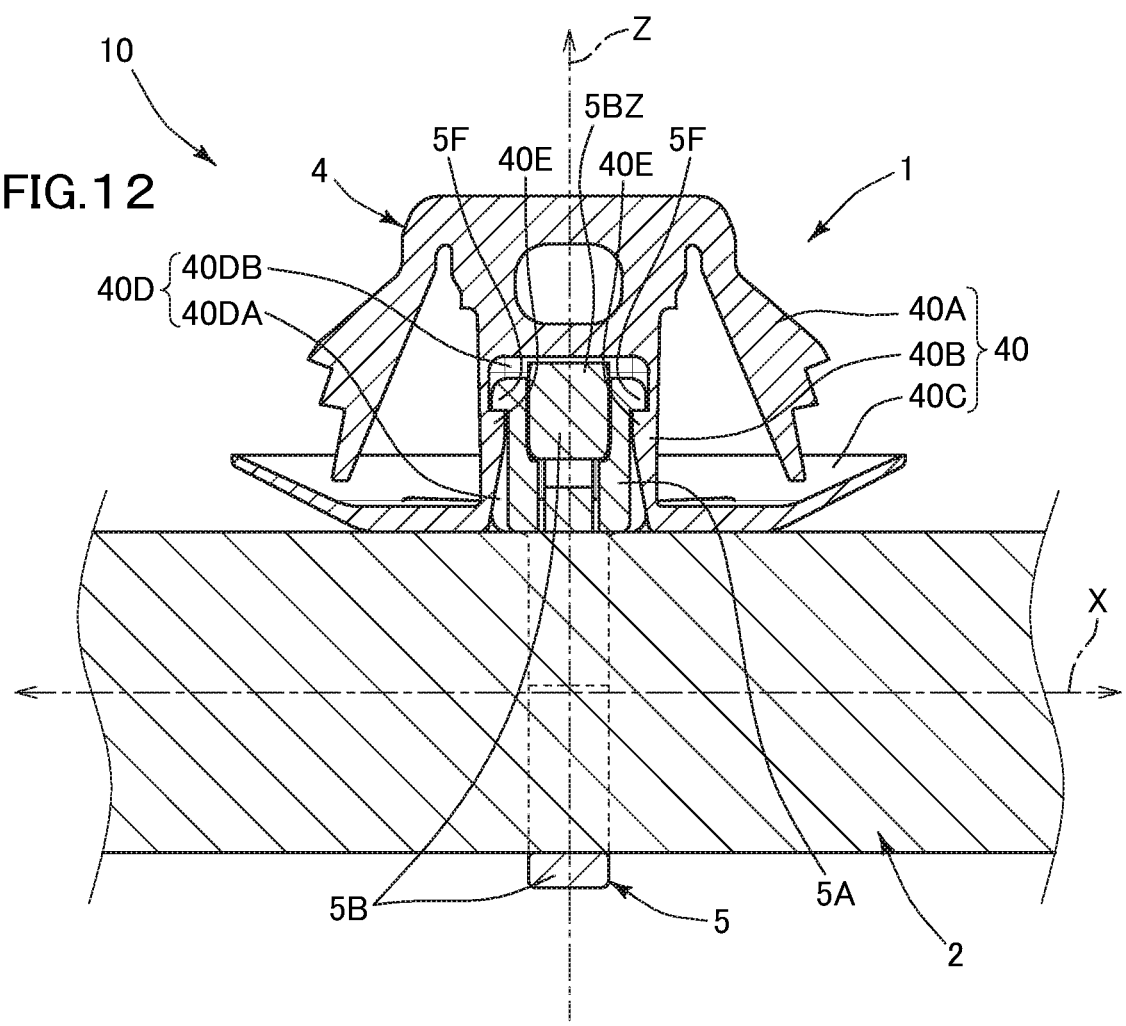
FIG. 12 is a third cross-sectional view of a procedure subsequent to that in FIG. 11, illustrating a cross-section of an engaging member in which the binding member, in FIG. 1, which has bound the wire routing material and the body member in FIG. 6 are combined with each other.
Figure 13:
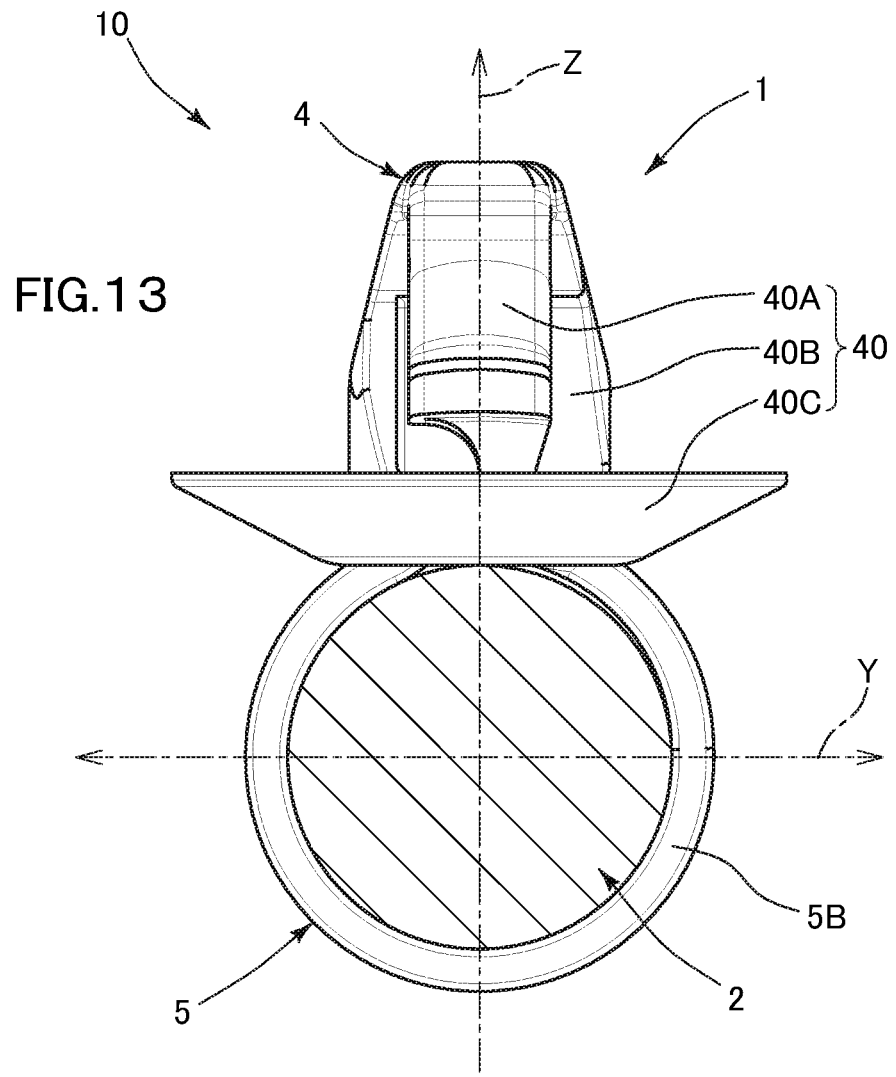
FIG. 13 is a side view of the engaging member in which the binding member, in FIG. 1, which has bound the wire routing material, and the body member in FIG. 6 are combined with each other.

An engaging member 1 (see FIG. 12 and FIG. 13) of this embodiment includes a binding member 5 shown in FIG. 1 to FIG. 5 and a body member 4 having an engaging portion 40 shown in FIG. 6 to FIG. 9. A binding structure 10, of the wire routing material 2, shown in FIG. 12 and FIG. 13 is formed so as to have an elongated wire routing material 2, and the engaging member 1 including the binding member 5 which binds the wire routing material 2, and the body member 4 combined with the binding member 5.

The wire routing material 2 is a flexible wire routing material having a bundle of a plurality of wires, and has an almost circular cross-section and extends in the longitudinal direction (longitudinal direction X). The wire routing material 2 is a wire harness that forms a signal line. The wire routing material 2 of this invention is not limited to the wire harness.

The binding member 5 is a resin molded product, and has a belt portion 5B that winds around the outer periphery of the elongated wire routing material 2, and a buckle portion 5A that can receive the belt portion 5B from the leading end of the belt portion 5B and fix the belt portion 5B, as shown in FIG. 1 to FIG. 5.

Figure 1:
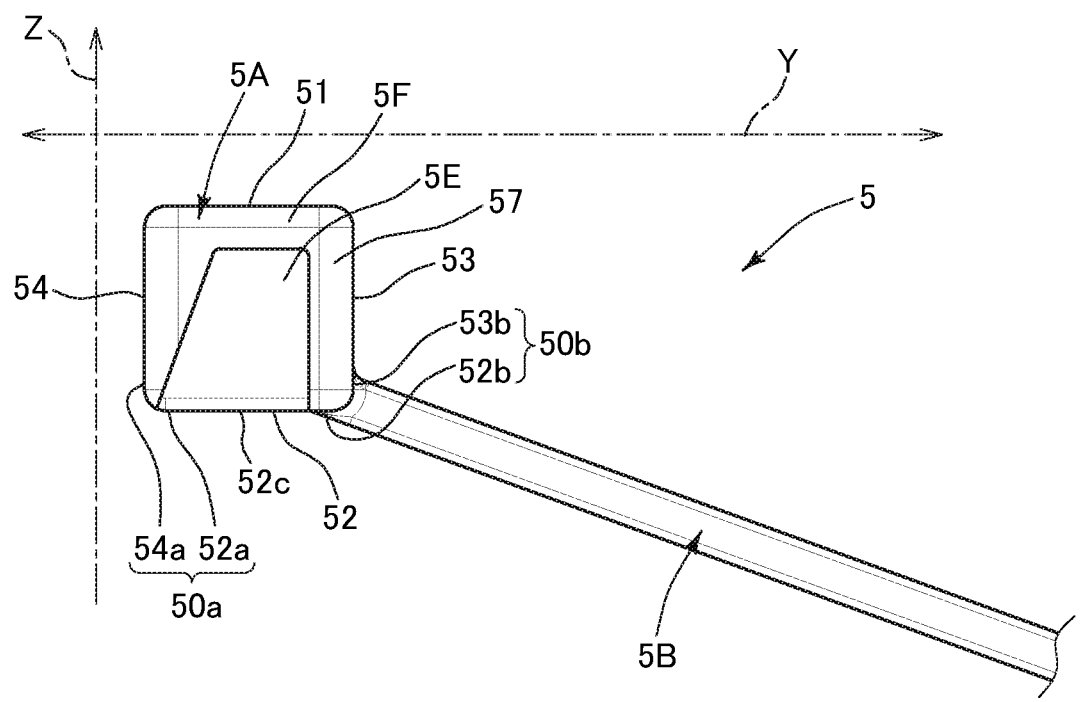
FIG. 1 is a side view of a binding member, in a non-binding state, of an engaging member according to a first embodiment of this invention.

As shown in FIG. 1, the buckle portion 5A has a pillar-like shape that extends upward in the direction perpendicular to a lower surface 52, and is shaped as a quadrangular prism (almost rectangular parallelepiped) in this embodiment. In this embodiment, the buckle portion 5A is disposed at one end of the belt portion 5B, and the other end of the belt portion 5B is inserted in a belt insertion portion 5H, thereby fixing the belt portion 5B. The buckle portion 5A has a higher stiffness than the belt portion 5B that can be deformed so as to surround the wire routing material 2.

Figure 3:
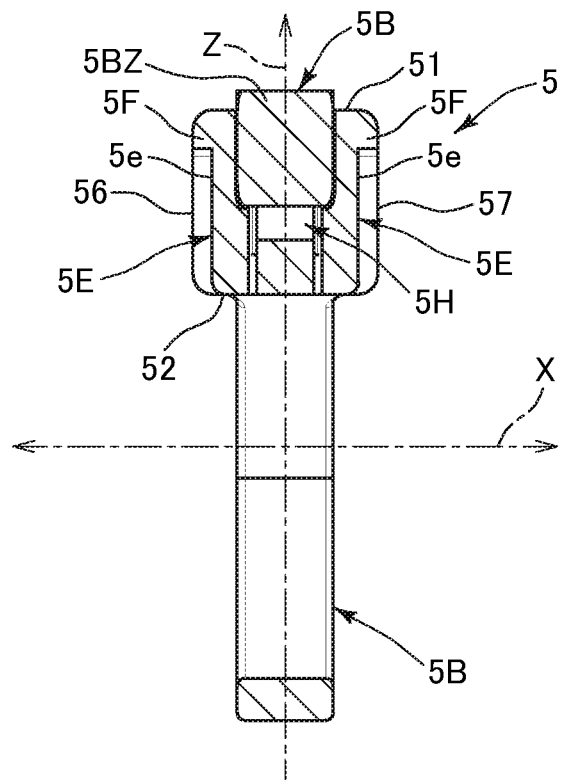
FIG. 3 is a cross-sectional view taken along a line in FIG. 2.
Figure 4:
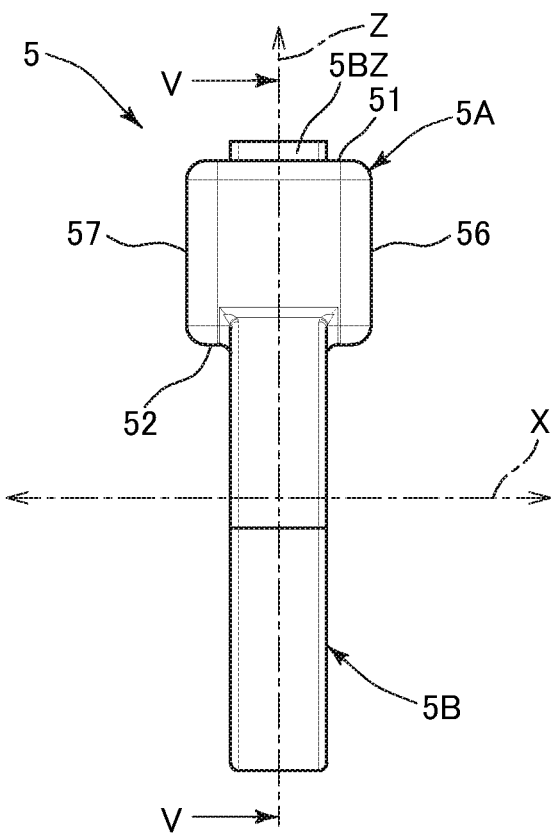
FIG. 4 is a front view of the binding member in FIG. 1 in the binding state.
Figure 5:
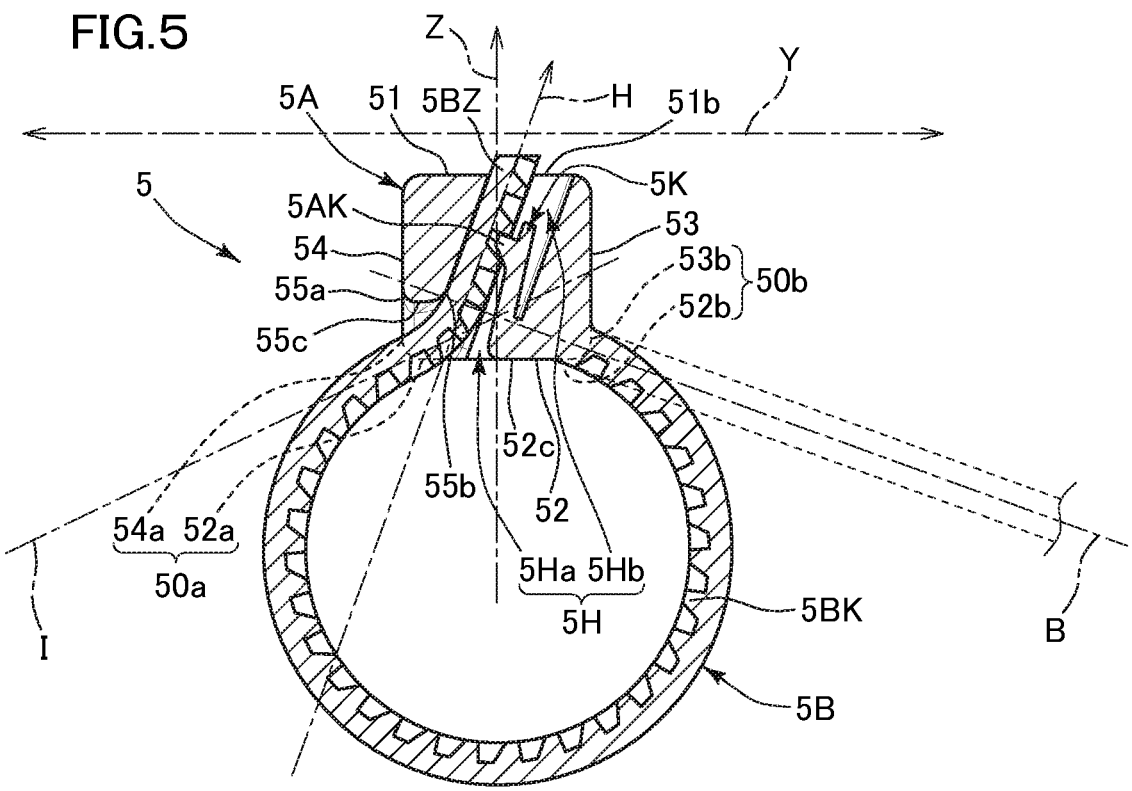
FIG. 5 is a cross-sectional view taken along a line V-V in FIG. 4.
Figure 6:
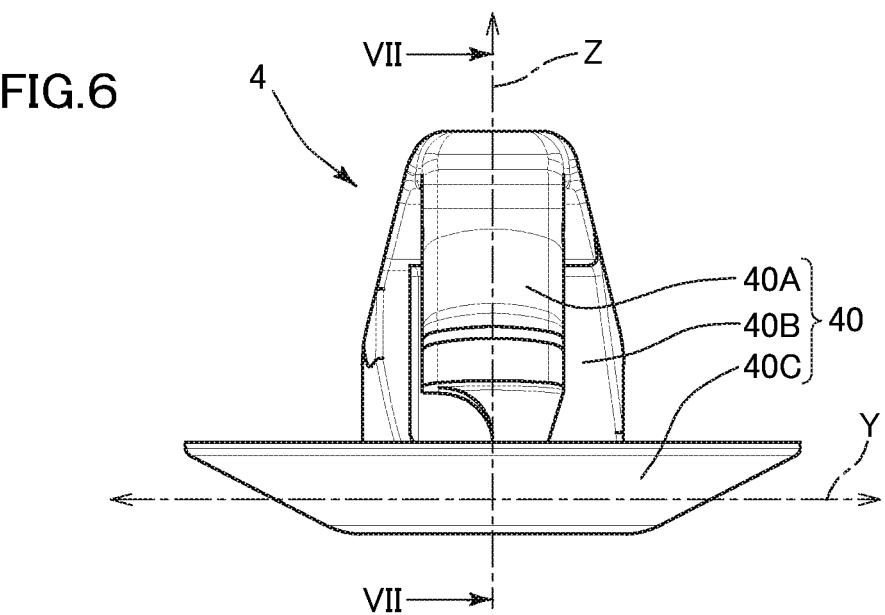
FIG. 6 is a side view of a body member.

The belt portion 5B extends diagonally downward from a first side corner portion 50b located on the lower side at a first side (right side in FIG. 1), in the left-right direction Y, of the buckle portion 5A, in the first side direction, as shown in FIG. 1. Meanwhile, the buckle portion 5A has the belt insertion portion 5H that is opened at a second side corner portion 50a located on the lower side, at a second side opposite to the first side in the left-right direction Y, as shown in FIG. 5. The belt insertion portion 5H penetrates through the buckle portion 5A diagonally upward from the opened portion toward the first side in the left-right direction Y, and is opened in the first side portion of an upper surface 51 of the buckle portion 5A. When the belt portion 5B that winds around the outer periphery of the wire routing material 2 has been inserted in the belt insertion portion 5H and fixed, the lower surface 52 of the buckle portion 5A is brought into contact with (may oppose) the wire routing material 2 at the center position, of the wire routing material 2, in the width direction (the same direction as the left-right direction Y, hereinafter referred to as the width direction Y)

as shown in FIG. 3, and the buckle portion 5A is erected upward (in a direction Z) so as to be perpendicular to the width direction Y.

Figure 2:
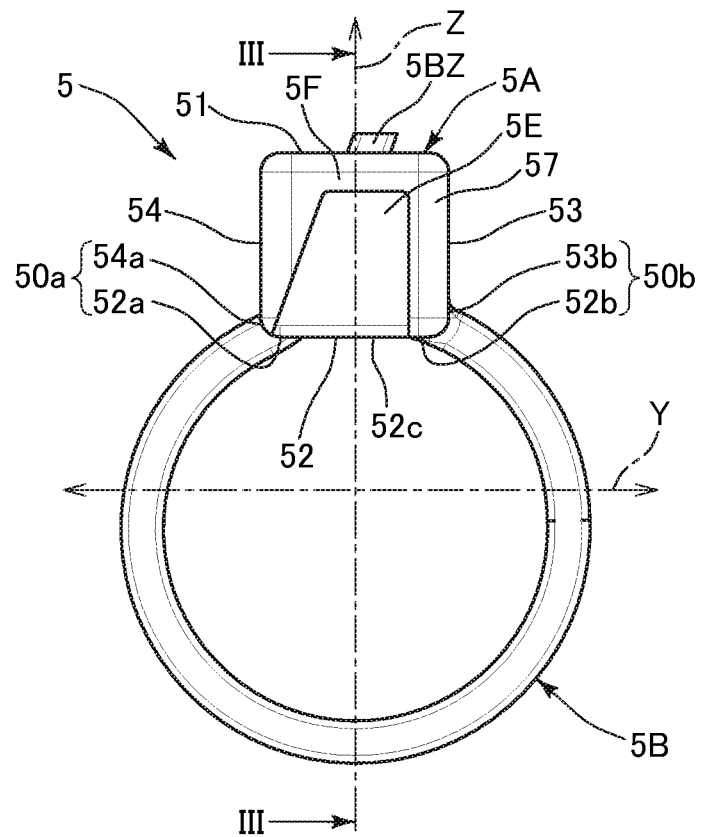
FIG. 2 is a side view of the binding member in FIG. 1 in a binding state.

In this embodiment, the first side corner portion 50b includes a first side surface lower region 53b on the lower side of a first side surface 53 located on the first side in the left-right direction Y in the buckle portion 5A, and a lower surface first side region 52b located on the first side of the lower surface 52 in the left-right direction Y in the buckle portion 5A, as shown in FIG. 2. Therefore, the belt portion 5B that extends from the first side corner portion 50b has its proximal end connected to the first side surface lower region 53b and the lower surface first side region 52b of the buckle portion 5A.

Furthermore, in this embodiment, the second side corner portion 50a includes a second side surface lower region 54a on the lower side of a second side surface 54 located on the second side in the left-right direction Y in the buckle portion 5A, and a lower surface second side region 52a located across the lower surface first side region 52b, on the second side of the lower surface 52 in the buckle portion 5A, such that a flat lower surface center region 52c is positioned between the lower surface second side region 52a and the lower surface first side region 52b, as shown in FIG. 2 and FIG. 5. Therefore, at the second side corner portion 50a, an opening region is formed by the second side surface lower region 54a and the lower surface second side region 52a.

The buckle portion 5A includes an upper-side inner wall surface 55c that extends from an upper edge 55a of an opening in the second side surface lower region 54a, toward the first side in the left-right direction Y, as shown in FIG. 5. The belt insertion portion 5H has an opening 5Ha formed below the upper-side inner wall surface 55c, and a through portion 5Hb that linearly penetrates through the buckle portion 5A diagonally upward, by an angle being changed, from a first side end 55b on the first side (right side in FIG. 5) of the upper-side inner wall surface 55c. Thus, an opening formed in the first side and the lower side portions of the belt insertion portion 5H is widened. The upper surface 51 has an opening (opening region 51b) of the through portion 5Hb in a region closer to the first side in the left-right direction Y. Furthermore, the upper surface 51 has an opening (51b) of the through portion 5Hb in a region closer to the first side in the left-right direction Y than the first side end 55b of the upper-side inner wall surface 55c is. However, the opening of the through portion 5Hb does not extend from the upper surface 51 to the first side surface 53.

The belt portion 5B has a plurality of latch claw portions 5BK along the longitudinal direction of the belt portion 5B. Meanwhile, the belt insertion portion 5H has a detachment preventing latch portion 5AK that latches the latch claw portion 5BK so as to prevent the belt portion 5B having been inserted in the belt insertion portion 5H from being detached in the direction opposite to the insertion direction H. When the belt portion 5B has been inserted in the belt insertion portion 5H, an elastic piece 5K having the detachment preventing latch portion 5AK is pushed so as to be elastically deformed by the latch claw portion 5BK, and the latch claw portion 5BK is moved deeper. The elastic piece 5K is elastically restored according to the latch claw portion 5BK passing over the detachment preventing latch portion 5AK, and the latch claw portion 5BK is latched by and against the detachment preventing latch portion 5AK of the elastic piece 5K in the direction opposite to the insertion direction H, so that the belt portion 5B enters a detachment preventing state. In the detachment preventing state, the latch claw portion 5BK, of the belt portion 5B, closer to the proximal end side is latched by the detachment preventing latch portion 5AK, thereby increasing a binding force of the belt portion 5B for binding the wire routing material 2.

The body member 4 is a resin molded product which is separate from the binding member 5. As shown in FIG. 6 to FIG. 9 and FIG. 14, the body member 4 has the engaging portion 40 for assembly into a vehicle body.

Figure 14:
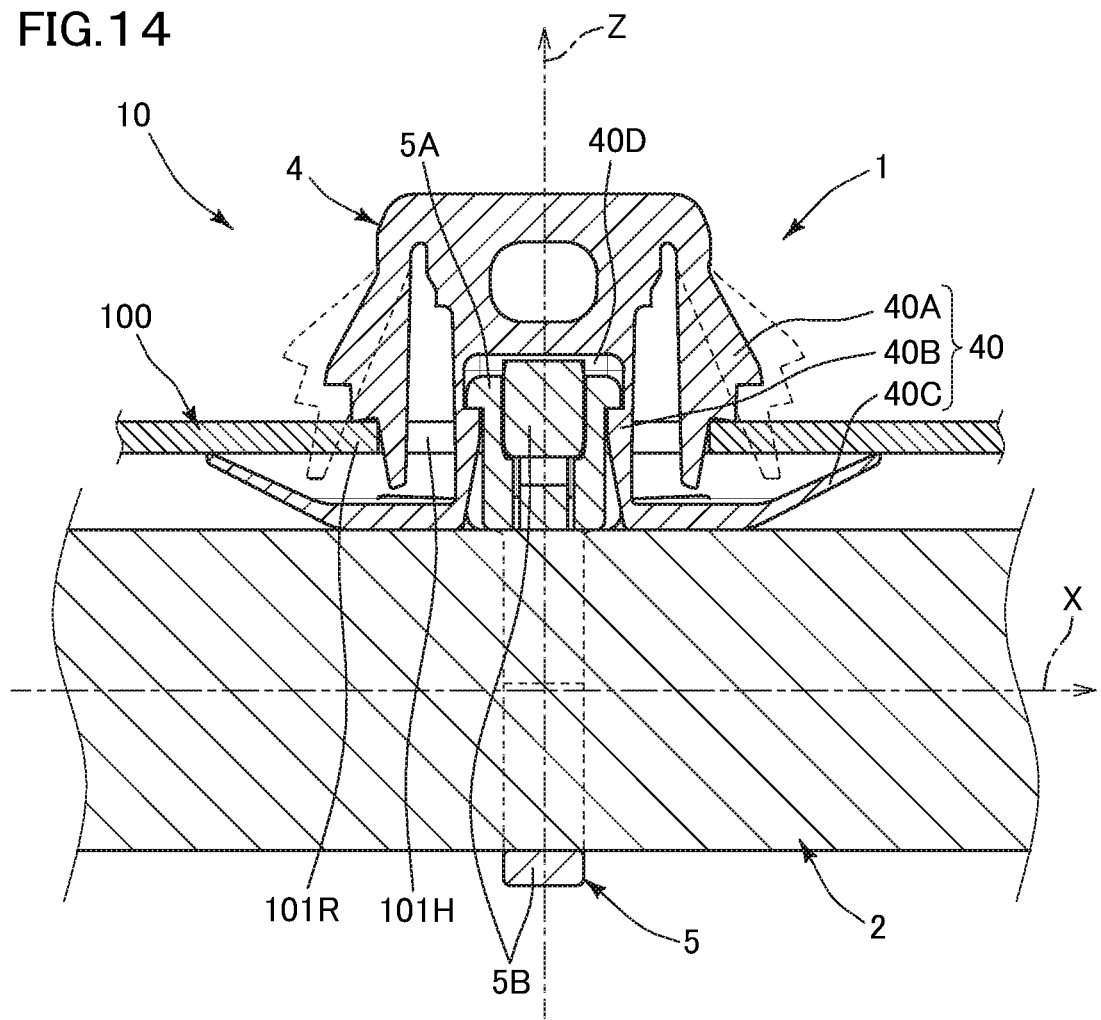
FIG. 14 is a cross-sectional view illustrating a state where the engaging member is assembled into a vehicle body.

The engaging portion 40 includes a pillar portion 40B, an elastic latch piece 40A, and a contact portion 40C. The pillar portion 40B is inserted in a fixing hole 101H disposed in a panel member 100 of a vehicle body, as shown in FIG. 14. The elastic latch piece 40A and the pillar portion 40B are inserted in the fixing hole 101H. When inserted, the elastic latch piece 40A is elastically deformed so as to approach the pillar portion 40B, and the elastic latch piece 40A is elastically restored when having been inserted, and is latched by a peripheral portion 101R of the fixing hole 101H, whereby the elastic latch piece 40A is prevented from being detached in the direction opposite to the insertion direction Z. The contact portion 40C holds the peripheral portion 101R of the fixing hole 101H between the contact portion 40C and the elastic latch piece 40A in the detachment preventing state. The contact portion 40C has a dish-plate-like shape that spreads outward toward the end portion from the proximal end side of the pillar portion 40B. Note that the engaging portion 40 may have a configuration in which the contact portion 40C is omitted.

Figure 7:
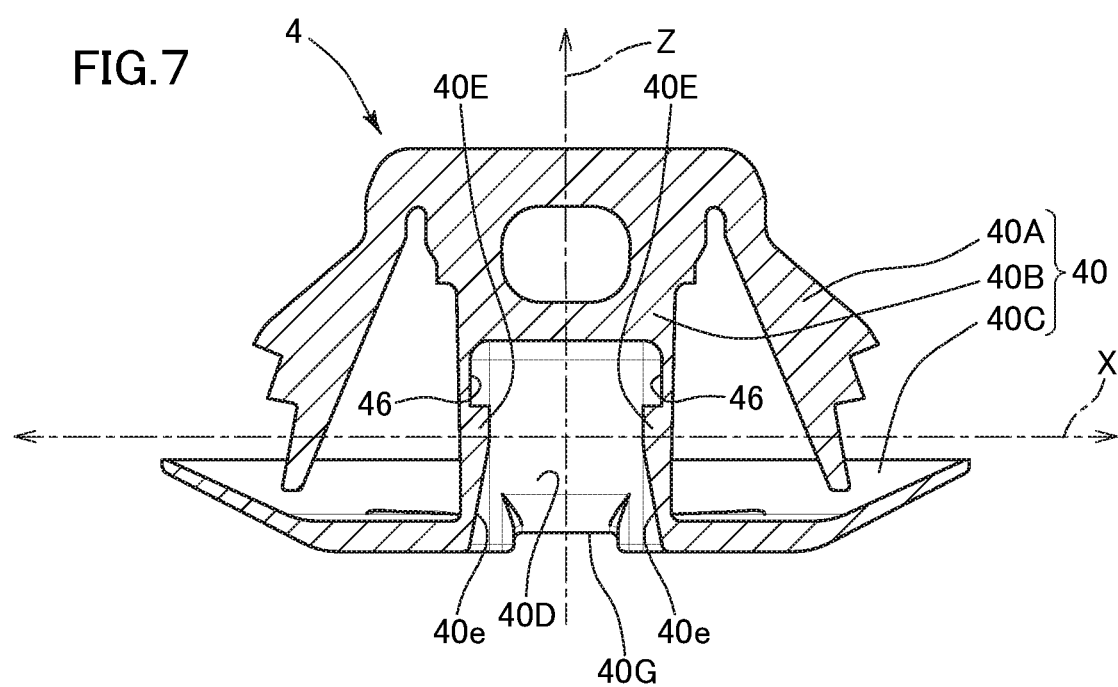
FIG. 7 is a cross-sectional view taken along a line VII-VII in FIG. 6.
Figure 8:
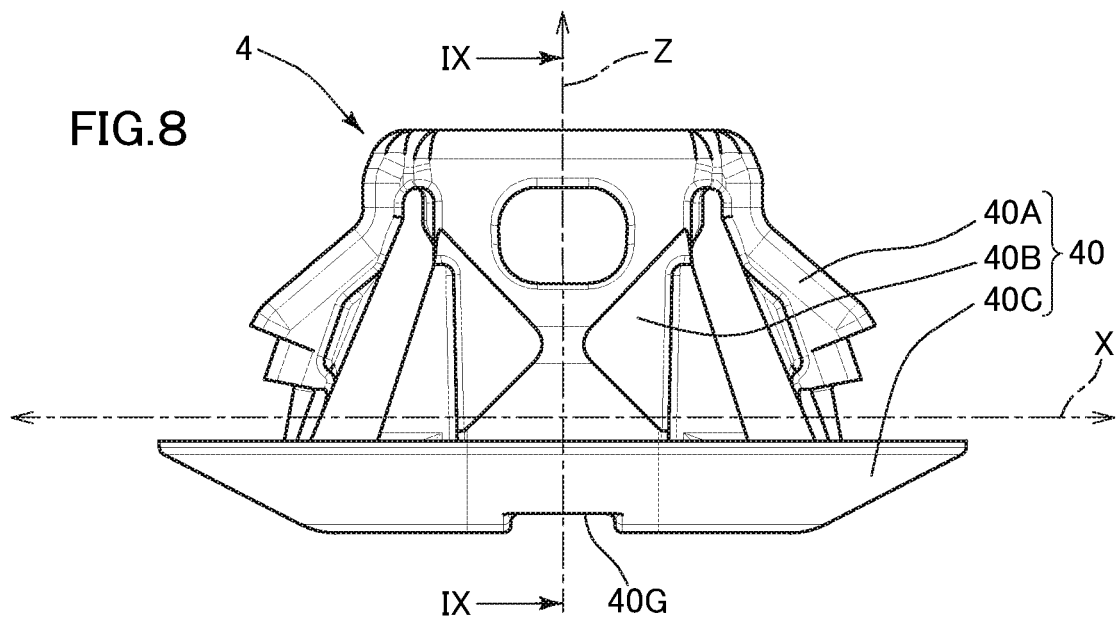
FIG. 8 is a front view of the body member in FIG. 6.
Figure 9:
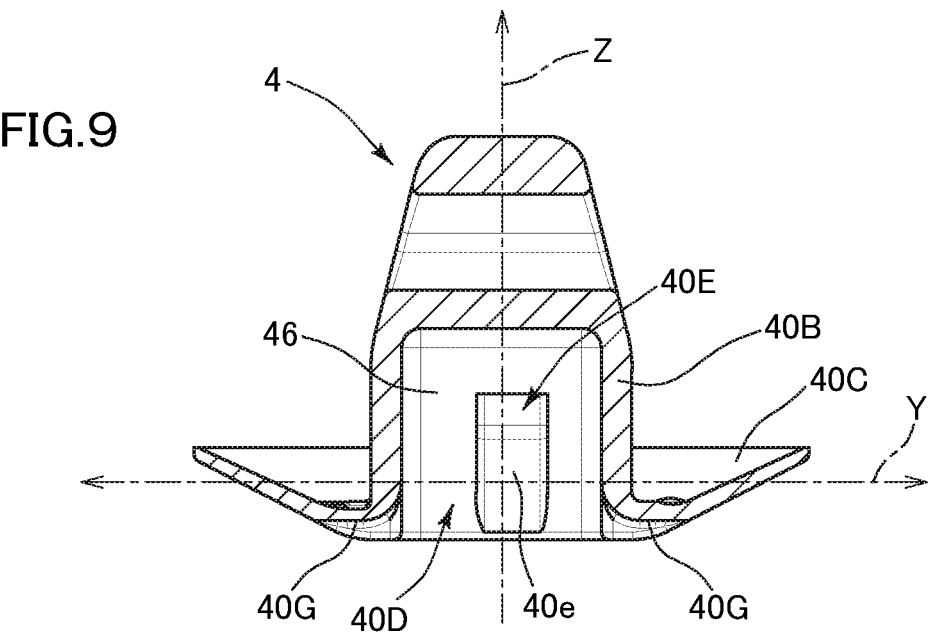
FIG. 9 is a cross-sectional view taken along a line IX-IX in FIG. 8.

The body member 4 has a buckle storing portion 40D as shown in FIG. 7 and FIG. 9. The buckle storing portion 40D can store therein the buckle portion 5A of the binding member 5 and can be integrated with the buckle portion 5A. Thus, the body member 4 and the binding member 5 can be combined with each other (see FIG. 10 to FIG. 12).

The buckle storing portion 40D stores the buckle portion 5A which has been inserted from the lower surface of the pillar portion 40B in the insertion direction Z as shown in FIG. 7 and FIG. 9. Specifically, the buckle storing portion 40D can be formed as a recess that is recessed from the lower surface of the pillar portion 40B in the insertion direction Z, or a through portion that penetrates from the lower surface of the pillar portion 40B in the insertion direction Z. In this embodiment, the buckle storing portion 40D is formed as a recess in the pillar portion 40B.

The buckle storing portion 40D has a main storing portion 40DA for storing the buckle portion 5A, and a projection end storing portion 40DB capable of storing a leading end 5BZ, of the belt portion 5B, which has been inserted through the belt insertion portion 5H of the buckle portion 5A toward the depth side in the storing direction (insertion direction Z) and projects, as shown in FIG. 12. The leading end portion of the belt portion 5B projects when the belt portion 5B has been inserted through the belt insertion portion 5H, and the leading end portion is cut. However, the leading end 5BZ (cut end) projects slightly outward from the belt insertion portion 5H. The leading end 5BZ has a sharp corner edge and may be dangerous. However, when the leading end 5BZ is stored in the buckle storing portion 40D, the leading end 5BZ is prevented from being exposed to the outside.

The buckle portion 5A has buckle-side engaging portions 5E on outer surfaces 56 and 57, as shown in FIG. 1 to FIG. 3. Meanwhile, the buckle storing portion 40D has, on inner wall surfaces 46 and 46, storage-side engaging portions 40E that engage with the buckle-side engaging portions 5E as shown in FIG. 7.

The buckle-side engaging portions 5E are formed on the outer surfaces 56 and 57 that serve as front and back surfaces, in a region other than surfaces 52, 54, and 51 in which an insertion inlet and an insertion outlet of the belt insertion portion 5H are formed, as shown in FIG. 2 and FIG. 3. In this embodiment, the buckle-side engaging portions 5E are formed in the outer surfaces 56 and 57 as engagement recesses that are recessed inward. Latch wall portions 5F are disposed so as to extend on and from bottom surfaces 5e of the engagement recesses, on the storing direction (the same direction as the insertion direction Z) side. Meanwhile, the storage-side engaging portions 40E are formed as engagement projections that project from the inner wall surfaces 46 and 46 of the buckle storing portion 40D.

Figure 10:
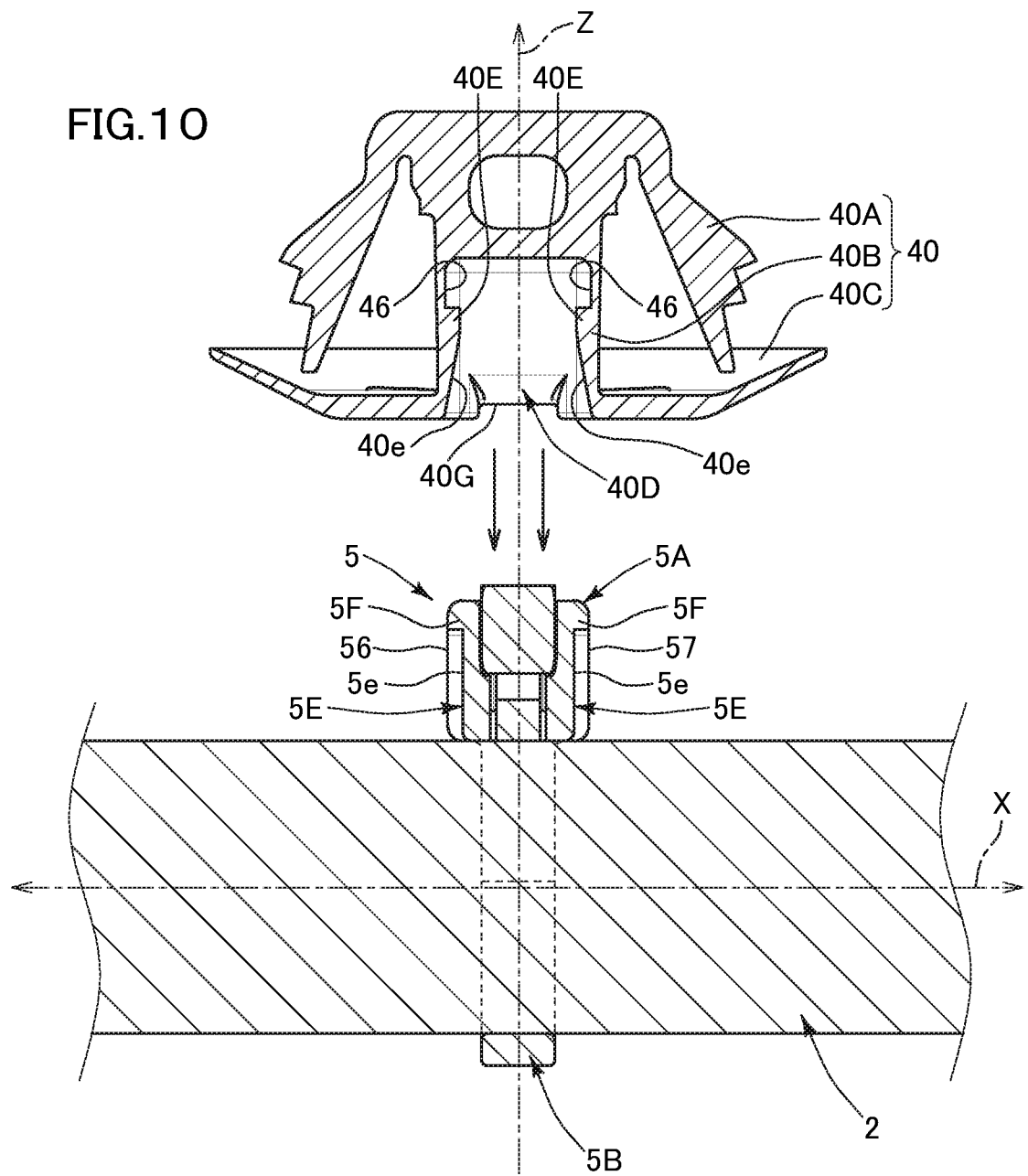
FIG. 10 is a first cross-sectional view illustrating a procedure for combining the binding member, in FIG. 1, which has bound a wire routing material and the body member in FIG. 6.
Figure 11:
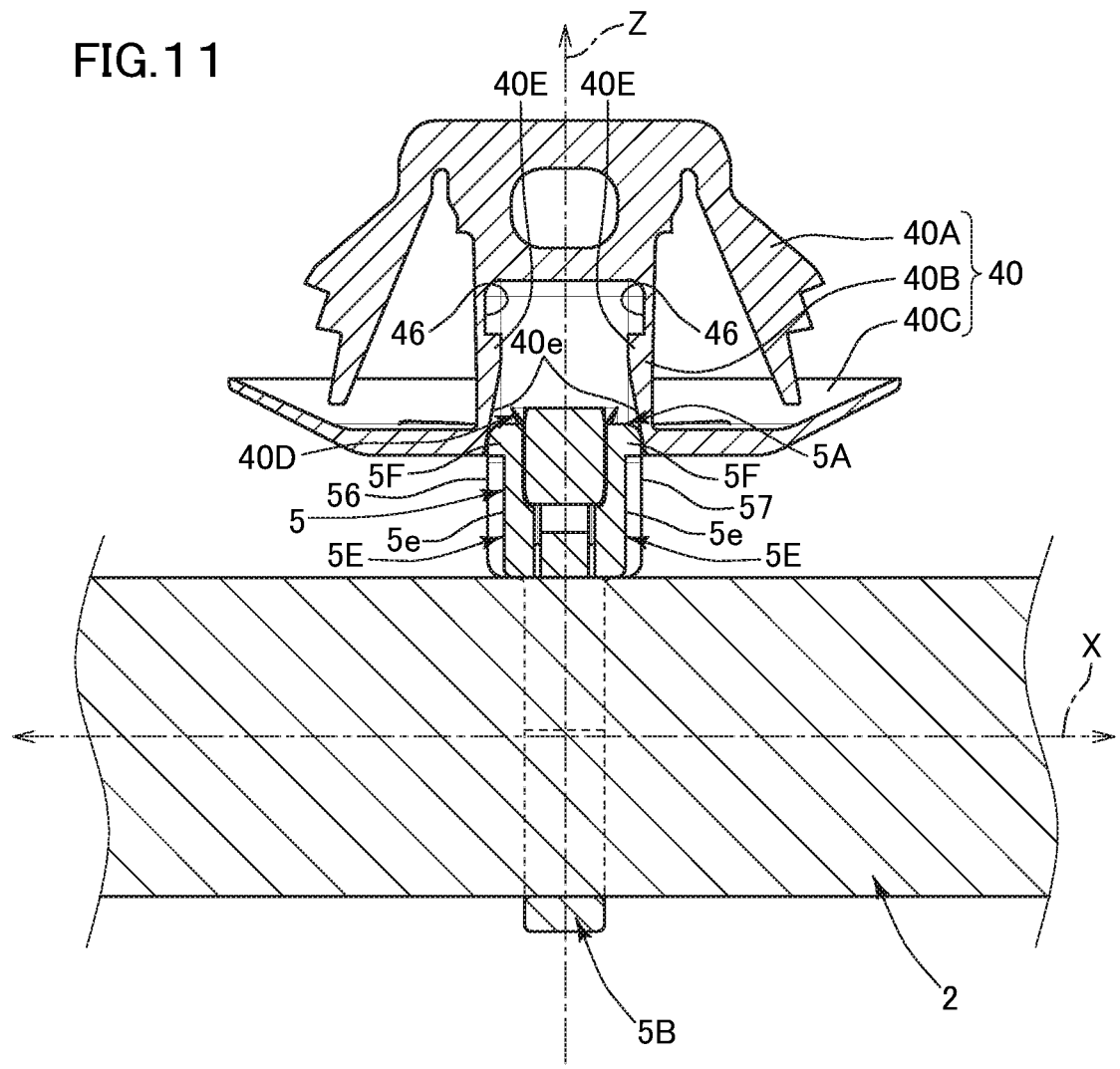
FIG. 11 is a second cross-sectional view illustrating a procedure subsequent to that in FIG. 10.

As shown in FIG. 10 to FIG. 12, when the buckle portion 5A is stored and combined into the buckle storing portion 40D, the storage-side engaging portions 40E of the buckle storing portion 40D are moved over the latch wall portions 5F of the buckle portion 5A such that both or one of the storage-side engaging portions 40E and the latch wall portions 5F are elastically deformed (see FIG. 11), and the storage-side engaging portions 40E are thereafter stored in the buckle-side engaging portions 5E formed as the engagement recesses. The storage-side engaging portions 40E which have been moved over the latch wall portions 5F are latched by the latch wall portions 5F so as to prevent the storage-side engaging portions 40E from being detached, thereby entering combined-engaged state (see FIG. 12).

In this embodiment, the storage-side engaging portions 40E have tilted surfaces 40e that are tilted upward such that the tilted surfaces 40e are separated from the inner wall surfaces 46 and 46 toward the side opposite to the storage inlet of the buckle storing portion 40D. When the buckle portion 5A is stored, the latch wall portions 5F slide upward on the tilted surfaces 40e (see FIG. 11). The tilted surfaces 40e allow the buckle portion 5A to easily enter the buckle storing portion 40D.

When the buckle portion 5A of the binding member 5 has been thus combined into the buckle storing portion 40D of the body member 4, the buckle portion 5A is placed so as to be almost erected relative to the wire routing material 2 which has been bound by the belt portion 5B, as shown in FIG. 12. At this time, the position of the buckle portion 5A placed on the wire routing material 2 is the center position, in the width direction Y, of the wire routing material 2, and the buckle portion 5A is erected in the direction (in this embodiment, the same direction as the insertion direction Z) orthogonal to the width direction Y. Specifically, as shown in FIG. 5, the belt portion 5B extends diagonally downward from the first side corner portion 50b of the lower surface 52 of the box-shaped buckle portion 5A, and the leading end is inserted through the buckle portion 5A diagonally upward from the second side corner portion 50a of the lower surface 52 of the buckle portion 5A. Therefore, the proximal end portion of the belt portion 5B and a portion, of the belt portion 5B, immediately preceding a position from which the belt portion 5B is inserted in the buckle portion 5A are symmetrically positioned to form a truncated inverse-V-shape by which the wire routing material 2 is held between the proximal end portion and the immediately preceding portion. Thus, the buckle portion 5A is placed so as to be almost erected on the wire routing material 2 such that the lower surface 52 (specifically, lower surface center region 52c) is in contact with the center of the wire routing material 2 in the width direction.

In this invention, the "placed so as to be almost erected relative to a wire routing material" indicates that the buckle portion is placed on the wire routing material such that the axis, of the buckle portion erected like a pillar, which extends from the center position of the bottom surface of the buckle portion in the erection direction is identical to the line normal to the wire routing material. In the description herein, the axis of the buckle portion may be identical to the line normal to the wire routing material with an angular deviation of ±10 degrees and more preferably an angular deviation of ±5 degrees.

Figure 15:
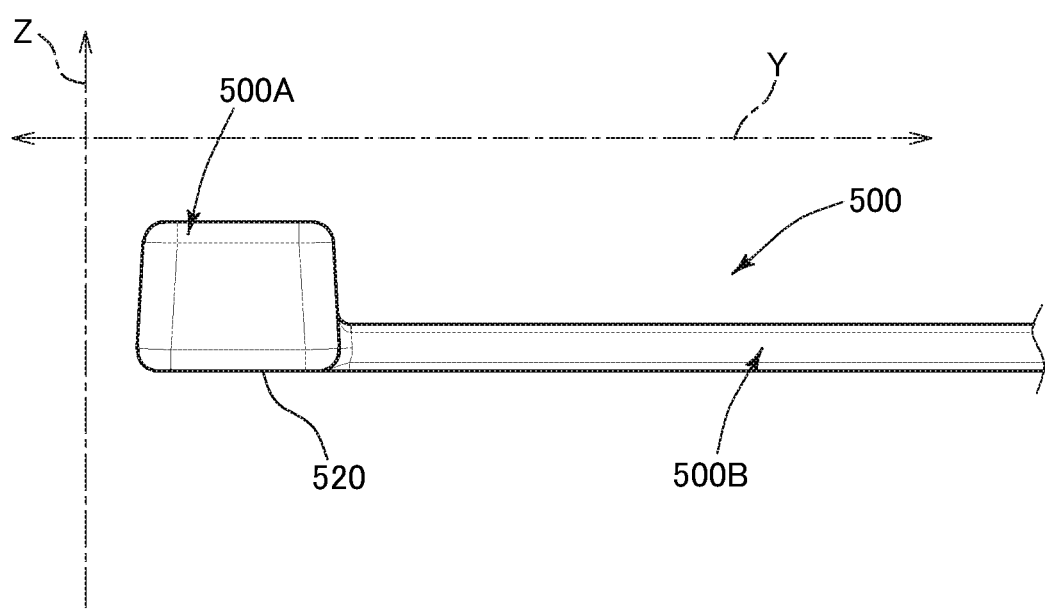
FIG. 15 is a side view of a conventional binding member in a non-binding state.
Figure 16:
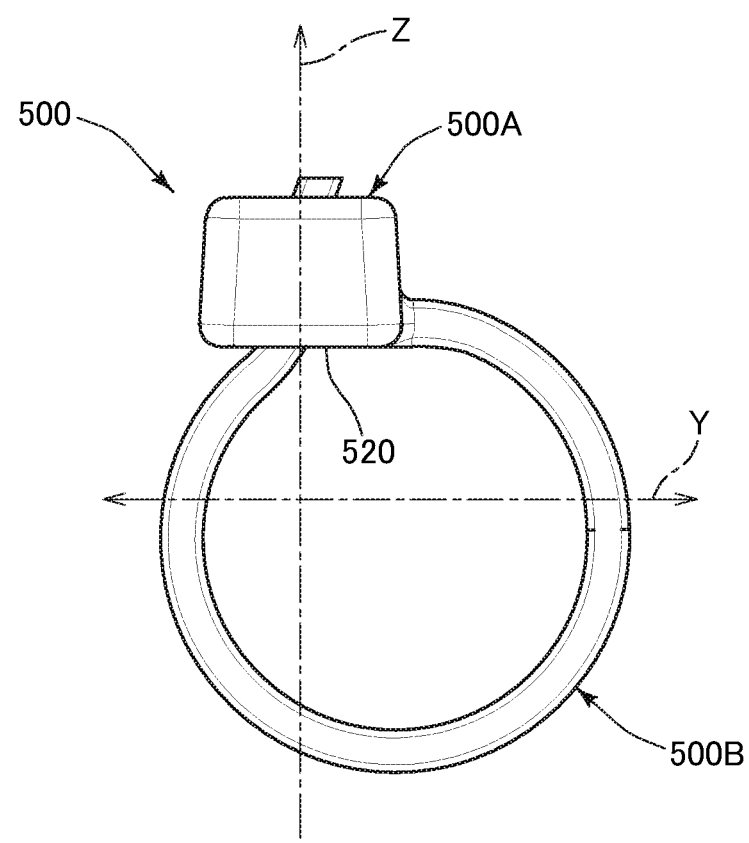
FIG. 16 is a side view illustrating a state where a wire routing material is bound by the binding member in FIG. 15.

As shown in FIG. 15, in a conventional binding member 500 such as a so-called tie band, unlike the binding member 5 of this embodiment, a belt portion 500B extends horizontally relative to the lower side of a buckle portion 500A which has a pillar-like shape and which extends upward relative to the lower surface 520, and is inserted almost directly upward (the direction Z in FIG. 16) from the lower surface 520 of the buckle portion 500A. Therefore, when the wire routing material 2 having an almost circular cross-section is bound, the buckle portion 500A cannot be positioned at the center of the wire routing material 2 in the width direction Y and is not erected on the wire routing material 2, as shown in FIG. 16. If the body member 4 is assumed to be combined in this state, the buckle portion 500A is not positioned at the center of the wire routing material 2 in the width direction Y, so that the placing state is unstable, and the body member 4 is not easily combined with the binding member 500 which has the wire routing material 2 bound thereto. In this embodiment, as shown in FIG. 2 and FIG. 13, the buckle portion 5A is positioned so as to be almost erected at the center of the wire routing material 2 in the width direction Y, so that the placing state is stable, and the body member 4 is easily combined with the binding member 5 that has the wire routing material 2 bound thereto.

As shown in FIG. 5, the opening 5Ha of the belt insertion portion 5H is widely formed over the second side surface lower region 54a and the lower surface second side region 52a. Therefore, a direction B in which the belt portion 5B extends from the first side, in the left-right direction Y, of the buckle portion 5A and an entering direction I in which the belt portion 5B enters the opening 5Ha on the second side, in the left-right direction Y, of the buckle portion 5A can be made almost laterally symmetric. Thus, the buckle portion 5A can be erected at the center of the wire routing material 2 in the width direction Y. In this embodiment, the direction B in which the belt portion 5B extends from the buckle portion 5A, and the penetrating direction H of the through portion 5Hb of the buckle portion 5A are orthogonal to each other. The penetrating direction H of the through portion 5Hb is changed relative to the entering direction I toward the inside of the opening 5Ha so as to be close to a direction (direction Z) in which the buckle portion 5A is erected, whereby the belt portion 5B that has been inserted in the belt insertion portion 5H is unlikely to be detached. The broken lines that extend parallel to the direction B shown in FIG. 5 represent the linear belt portion 5B (see FIG. 1) which is not deformed.

As shown in FIG. 7 and FIG. 9, in a state where the body member 4 has been combined with the binding member 5 that has the wire routing material 2 bound thereto, the body member 4 has belt storing portions 40G for storing the proximal end portion of the belt portion 5B that winds around the wire routing material 2 and a portion immediately preceding a position from which the belt portion 5B is inserted in the belt insertion portion 5H. Thus, the body member 4 in the combined state can be assuredly brought into contact with the wire routing material 2.

Although the embodiment of the invention has been described above, the embodiment is merely illustrative, the invention is not limited to the embodiment, and various modifications such as additions and omissions may be made based on the knowledge of a person skilled in the art without departing from the scope of the claims.

Hereinafter, embodiments other than the above-described embodiment and modifications of the embodiments will be described. Portions having the same functions as those in the above-described embodiment are designated by the same reference characters and the detailed description thereof is omitted.

In addition, the above-described embodiment, and the following other embodiments and modifications may be combined to be implemented as appropriate as long as no technical contradiction arises.

A first modification of the above-described embodiment will be described with reference to FIG. 17 to FIG. 22.

The buckle storing portion 40D of the body member 4 according to the above-describe embodiment receives the buckle portion 5A of the binding member 5 at the pillar portion 40B along the insertion direction Z. However, the buckle portion 5A may be stored from the direction orthogonal to the insertion direction Z. Specifically, the buckle storing portion 40D can be formed as a recess that is recessed from the front of the pillar portion 40B in the direction orthogonal to the insertion direction, or a through portion that penetrates from the front of the pillar portion 40B in the direction orthogonal to the insertion direction Z (not shown).

A second embodiment of this invention will be described with reference to FIG. 17 to FIG. 24.

Figure 17:
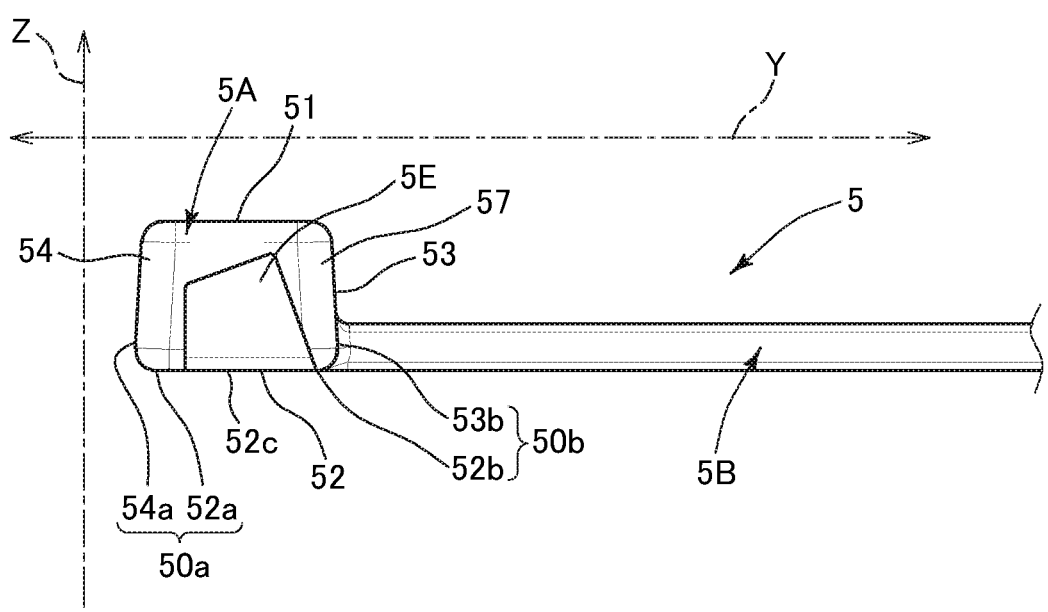
FIG. 17 is side view of a binding member, in a non-binding state, of an engaging member according to a second embodiment of this invention.
Figure 18:
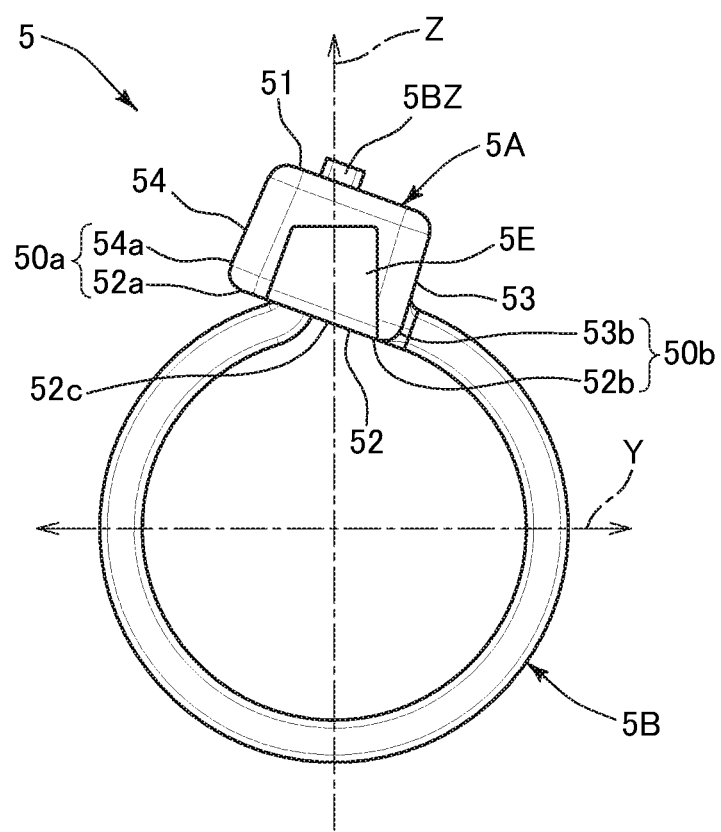
FIG. 18 is a side view of the binding member in FIG. 17 in a binding state.
Figure 19:
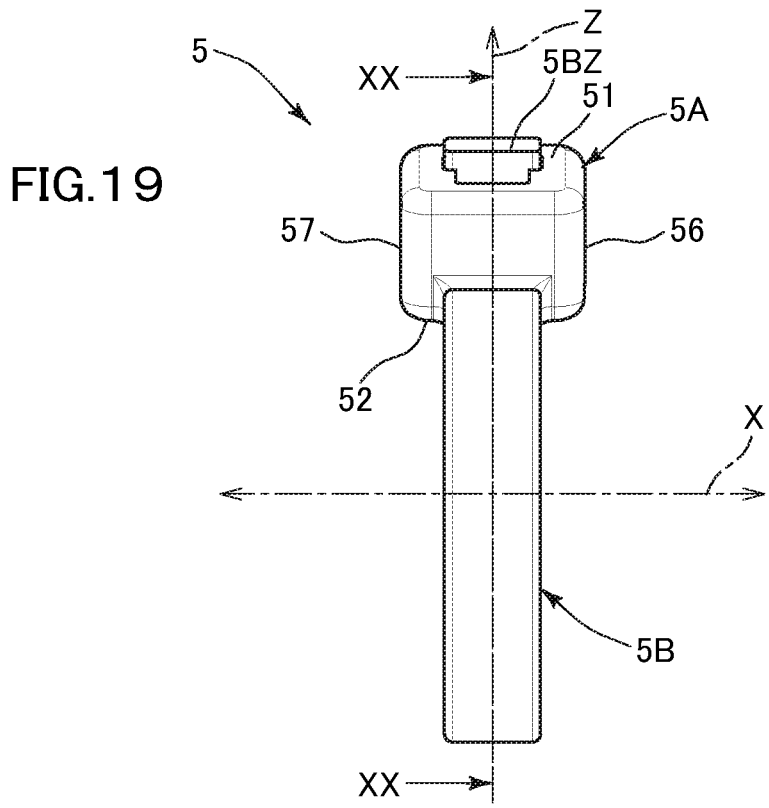
FIG. 19 is a front view of the binding member in FIG. 17 in a binding state.
Figure 20:
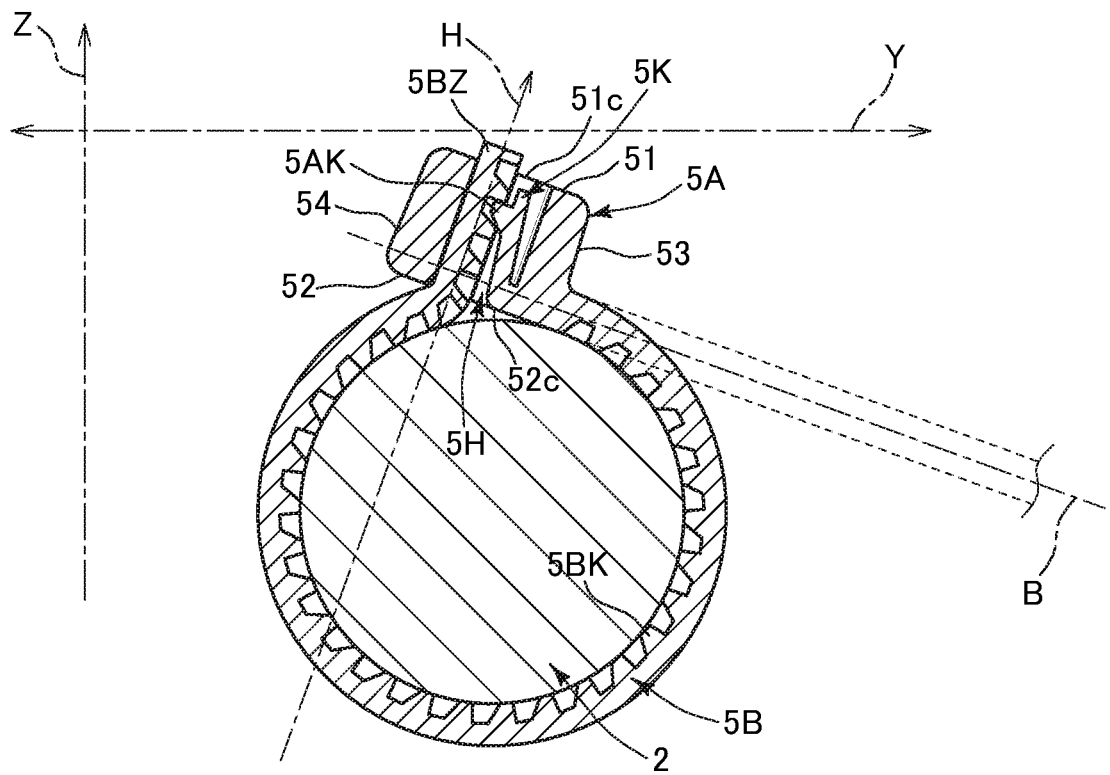
FIG. 20 is a cross-sectional view illustrating a state where a wire routing material is bound by the binding member in FIG. 17, in a cross-section taken along a line XX-XX in FIG. 19.
Figure 21:
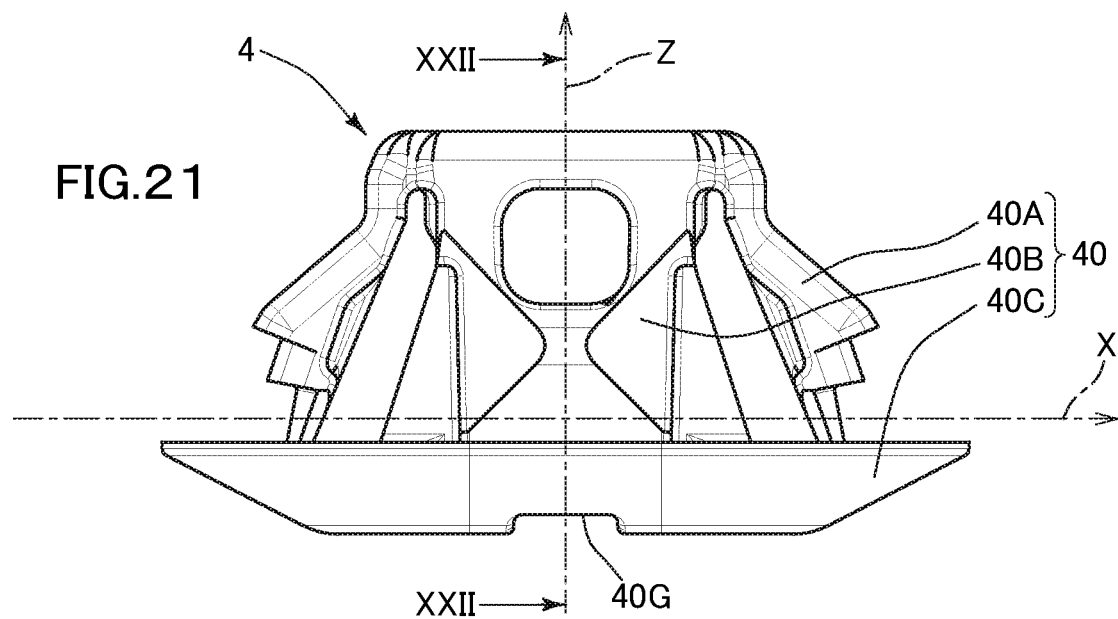
FIG. 21 is a front view of a body member corresponding to the binding member in FIG. 17.

In the binding member 5 of the second embodiment, the belt portion 5B extends horizontally from the first side corner portion 50b (specifically, first side surface lower region 53b) on the lower side of the pillar-shaped buckle portion 5A that extends upward relative to the lower surface 52, as shown in FIG. 17. Meanwhile, the buckle portion 5A has the belt insertion portion 5H that is opened to the lower surface center region 52c between the first side corner portion 50b and the second side corner portion 50a, as shown in FIG. 20. The belt insertion portion 5H penetrates through the buckle portion 5A upward from the opened portion and is opened to an upper surface center region 51c of the buckle portion 5A.

In the binding member 5 of the second embodiment, when the belt portion 5B winds around the outer periphery of the wire routing material 2, and inserted and fixed in the belt insertion portion 5H, if the buckle portion 5A is erected upward so as to be perpendicular to the width direction Y of the wire routing material 2, the buckle portion 5A is not positioned at the center, in the width direction Y, of the wire routing material 2, as in a conventional art (see FIG. 16). Although the buckle portion 5A may be positioned at the center, in the width direction Y, of the wire routing material 2, the buckle portion 5A may be tilted as shown in FIG. 20 in this case. In this modification, the body member 4 is directly combined, from above the buckle portion 5A, with the buckle portion 5A that is positioned in the tilted state at the center, in the width direction Y, of the wire routing material 2.

In the second embodiment, the buckle-side engaging portions 5E of the above-described embodiment are formed in the buckle portion 5A in the tilted state so as to be perpendicular to the width direction Y of the wire routing material 2. Thus, the buckle portion 5A in the tilted state can be combined into the buckle storing portion 40D of the body member 4 having the same structure as in the above-describe embodiment in the same manner as for the above-described embodiment (see FIG. 23 and FIG. 24). In this modification, the height of the buckle-side engaging portion 5E is slightly reduced as compared with that in the above-described embodiment.

Figure 22:
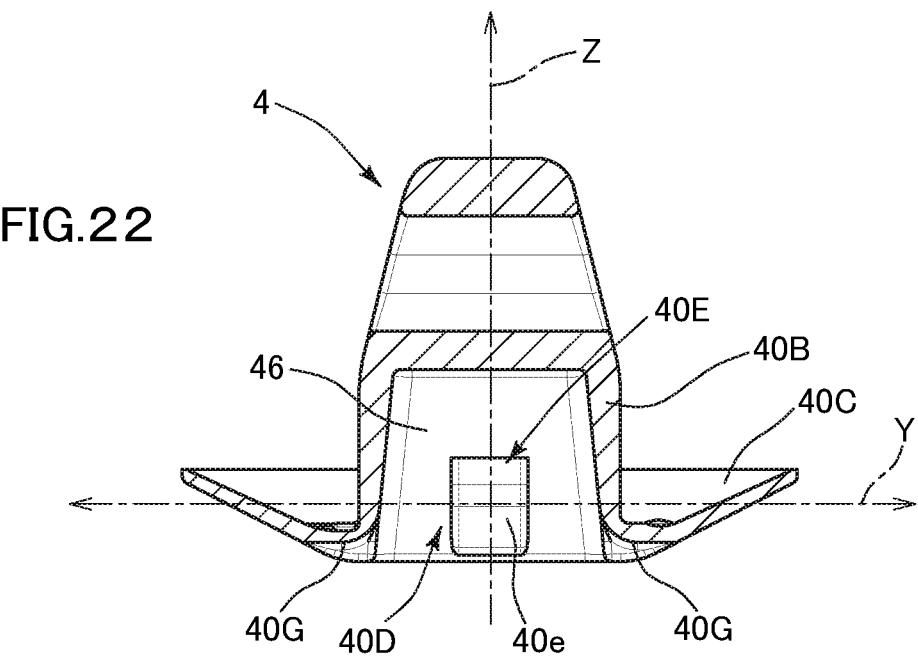
FIG. 22 is a cross-sectional view taken along a line XXII-XXII in FIG. 21.
Figure 23:
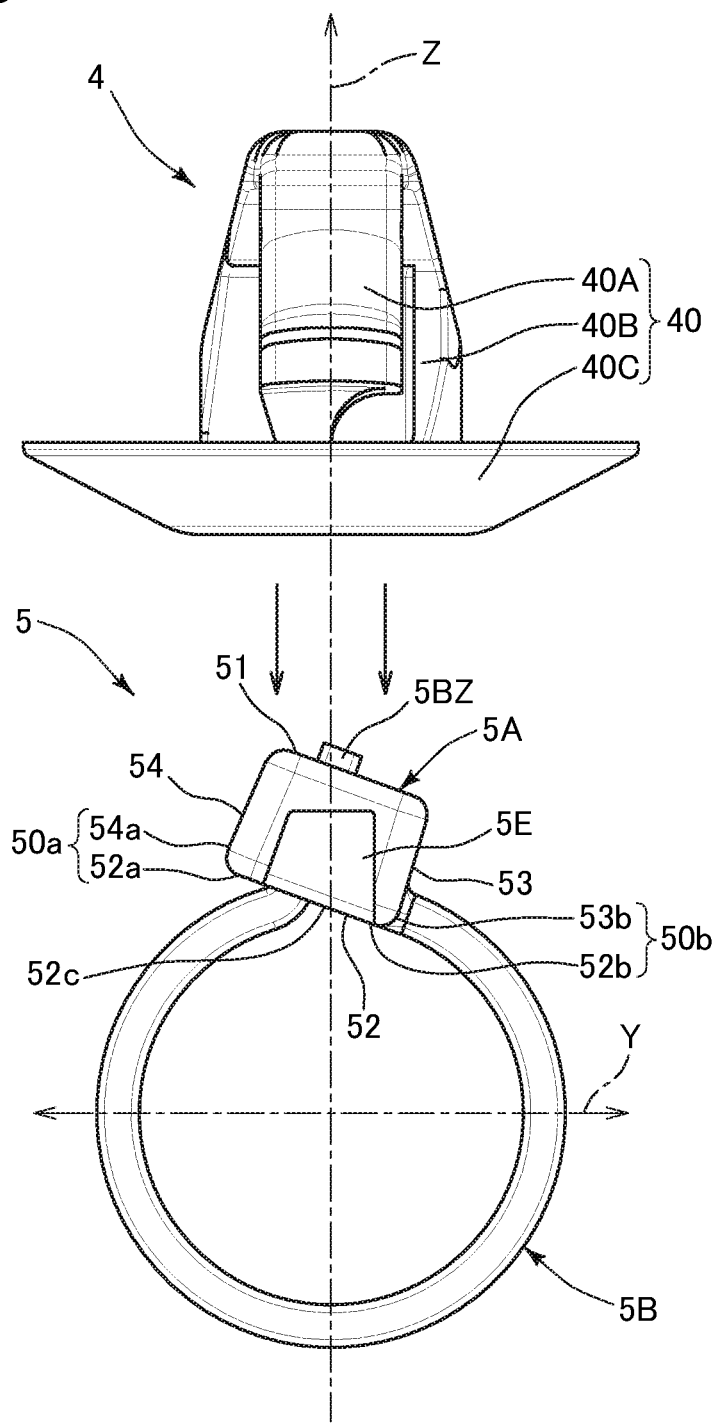
FIG. 23 is a side view illustrating a procedure for combining the binding member, in FIG. 17, which has bound a wire routing material and the body member in FIG. 21.
Figure 24:
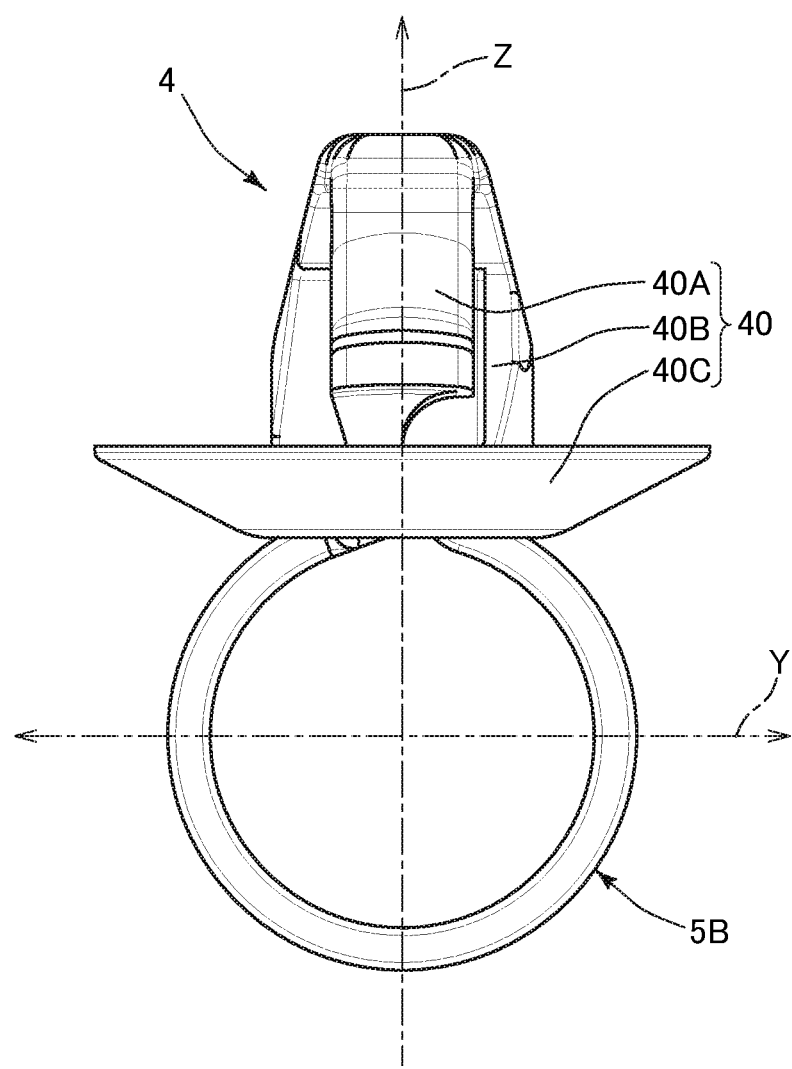
FIG. 24 is a side view of an engaging member in which the binding member, in FIG. 17, which has bound the wire routing material and the body member in FIG. 21 are combined with each other according to the procedure in FIG. 23.

Therefore, as shown in FIG. 22, the height of the storage-side engaging portion 40E of the body member 4 is also reduced according to the height of the buckle-side engaging portion 5E. However, the engaging mode is the same as described for the above-described embodiment.

A third embodiment of this invention will be described with reference to FIG. 25 to FIG. 28.

Figure 25:
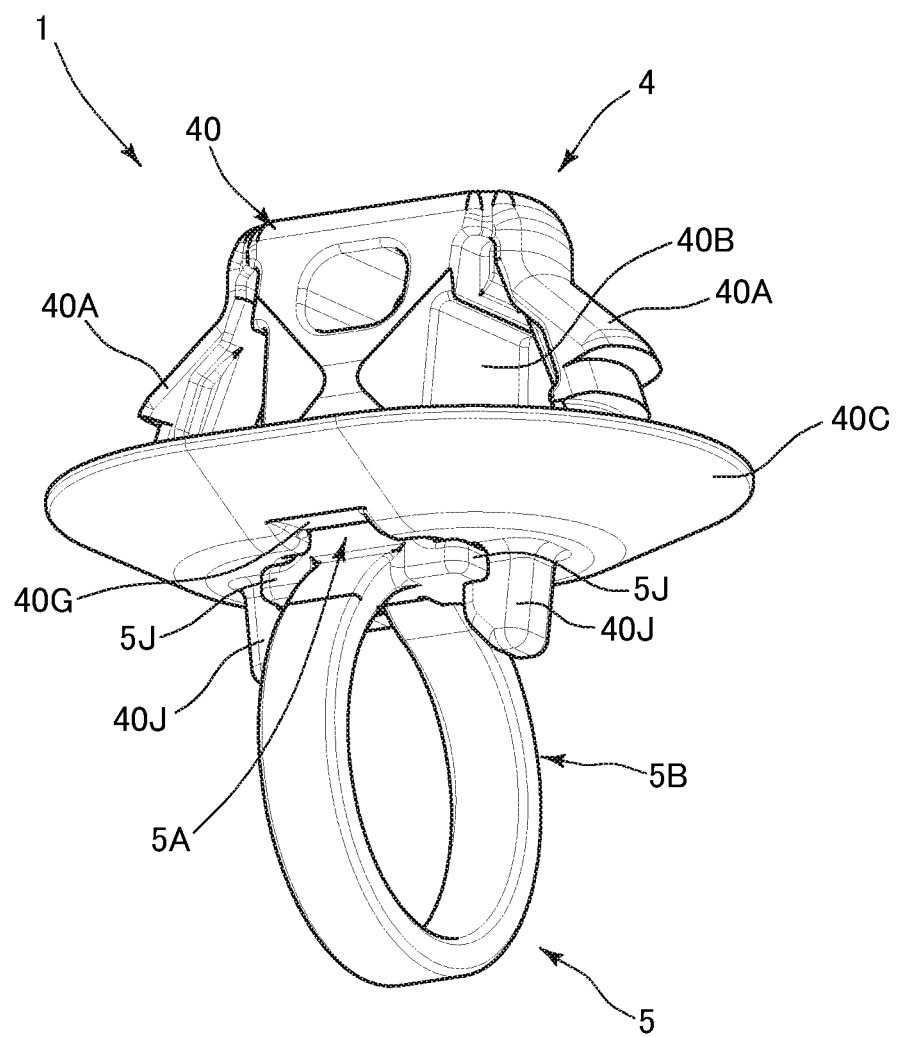
FIG. 25 is a perspective view of an engaging member according to a third embodiment of this invention.
Figure 26:
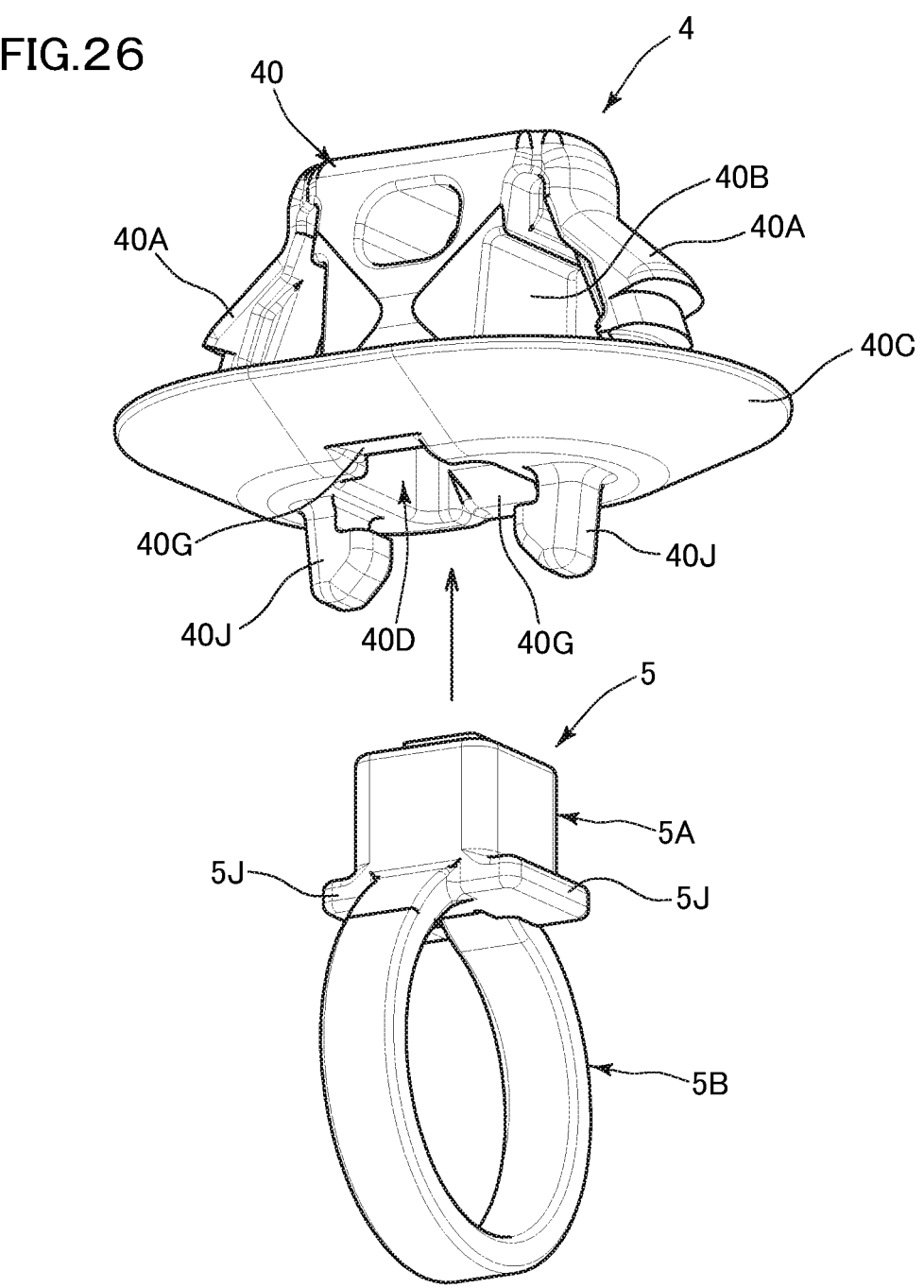
FIG. 26 is a perspective view illustrating a method for combining the binding member and the body member with each other in the engaging member in FIG. 25.
Figure 27:
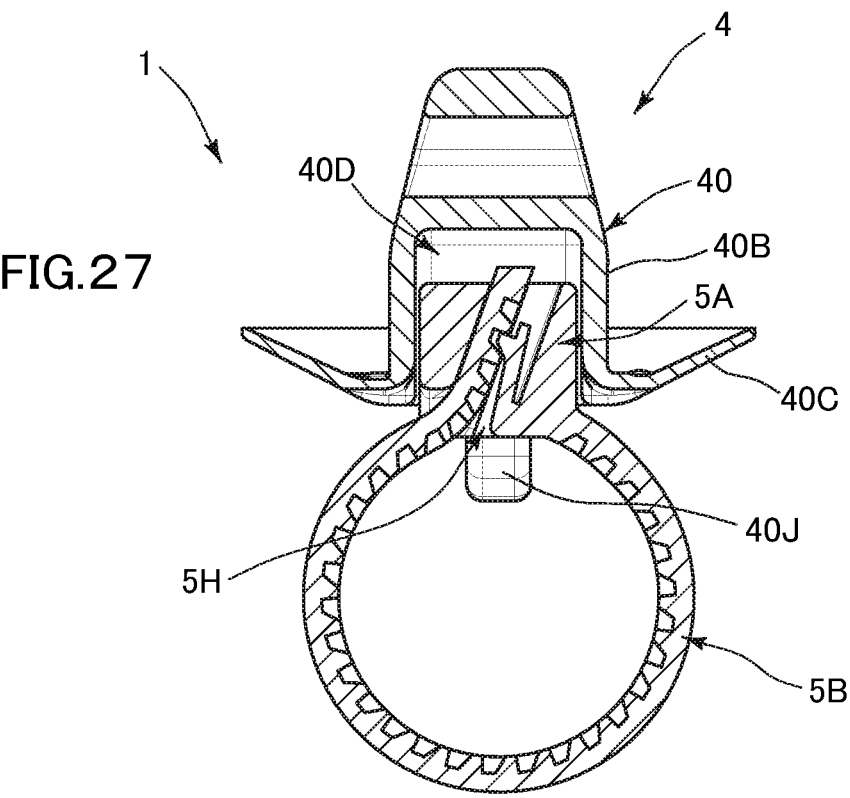
FIG. 27 is a cross-sectional view of the engaging member in FIG. 25, illustrating a cross-section of the binding member as taken along the same cross-section as in FIG. 5, and a cross-section of the body member as taken along the same cross-section as in FIG. 9.
Figure 28:
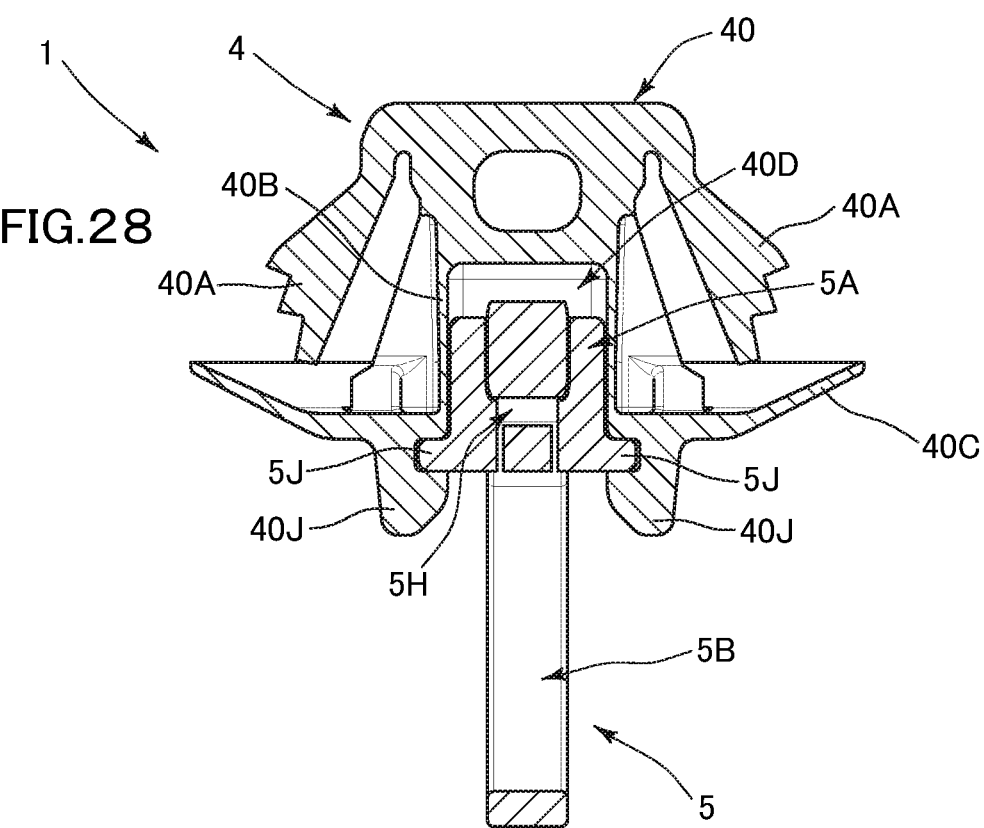
FIG. 28 is a cross-sectional view illustrating a cross-section of the engaging member in FIG. 25 as taken along the same cross-section as in FIG. 10 to FIG. 12.

The buckle portion 5A of the third embodiment has the belt insertion portion 5H for inserting the belt portion 5B as in the first embodiment (see FIG. 5). However, buckle-side engaging portions 5J disposed in the buckle portion 5A are different from the buckle-side engaging portions 5E (see FIG. 3) of the first embodiment. The buckle-side engaging portions 5J are lower surface outer peripheral portions of the buckle portion 5A, and the lower surfaces thereof serve as latch surfaces, as shown in FIG. 26. In this embodiment, the buckle portion 5A has, at the lower end portion thereof, lower end projections that project outward, and the lower end projections serve as the buckle-side engaging portions 5J. Meanwhile, the pillar portion 40B of the latch portion 40 has latch claw portions by and against which the lower surfaces (latch surfaces) of the lower surface outer peripheral portions of the buckle portion 5A are latched upward, as the storage-side engaging portions 40J, on the opening outer peripheral portion of the buckle storing portion 40D, so as to prevent the detachment, as shown in FIG. 25 and FIG. 28. In this embodiment, the storage-side engaging portions 40J project downward from the lower end portion of the pillar portion 40B such that the opening of the buckle storing portion 40D is positioned between the storage-side engaging portions 40J, and the storage-side engaging portions 40J have, at the end portions thereof, latch claws that project so as to approach each other. As shown in FIG. 26, when the buckle portion 5A is moved into the buckle storing portion 40D of the engaging portion 40 from the lower side in the upward direction (the direction indicated by an arrow in FIG. 26), the storage-side engaging portions 40J are pushed and widened outward by the buckle-side engaging portions 5J, respectively, and are elastically deformed to allow the buckle portion 5A to move inward. The storage-side engaging portions 40J are elastically restored when the buckle-side engaging portions 5J have passed, and are latched by the lower surfaces of the lower surface outer peripheral portions (buckle-side engaging portions 5J) of the buckle portion 5A, thereby entering the detachment preventing state (see FIG. 27 and FIG. 28).

Figure 29:
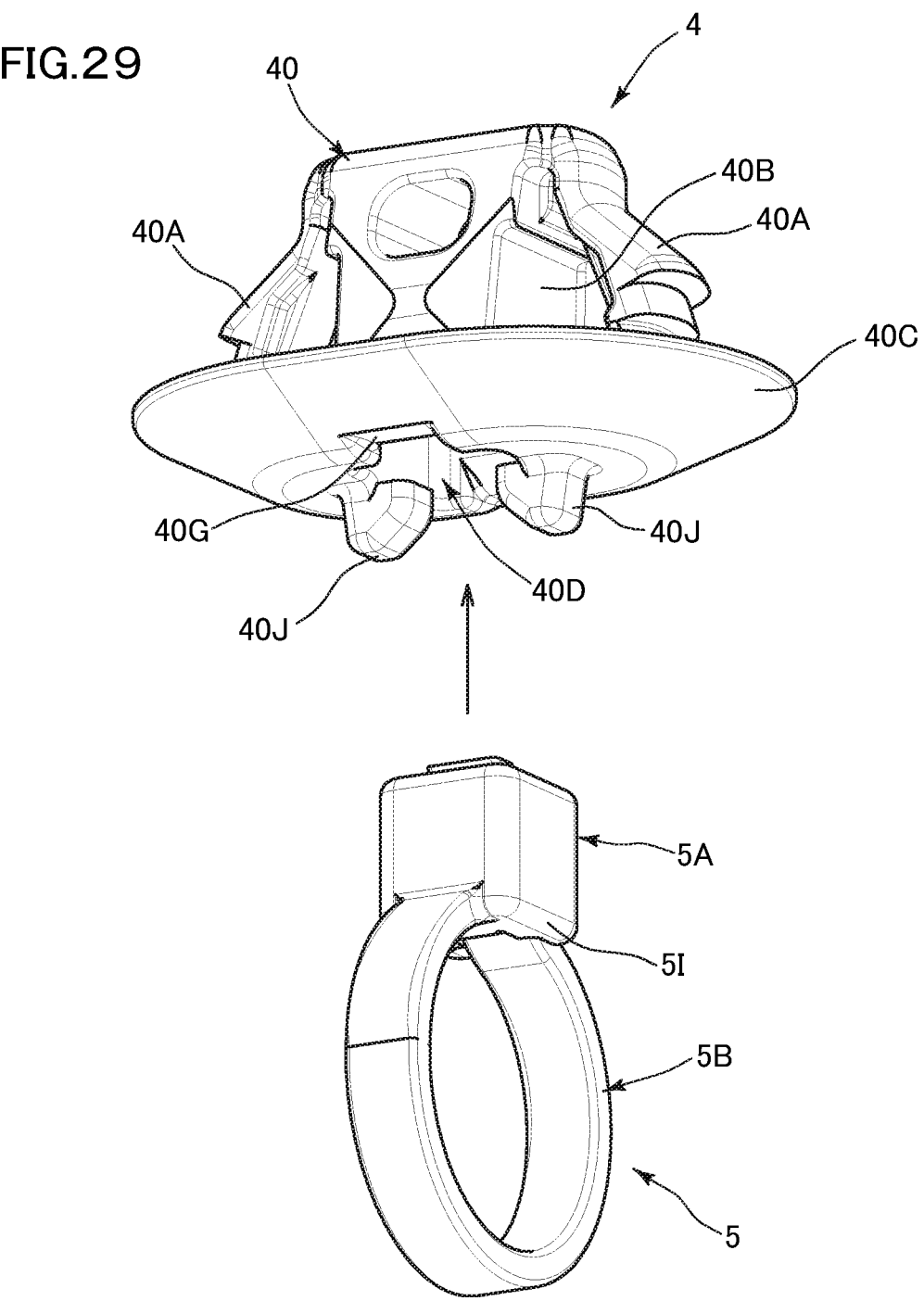
FIG. 29 is a perspective view illustrating a combining method for an engaging member according to modification of the third embodiment.

In the third embodiment, as shown in FIG. 29, the buckle portion 5A may be shaped as a quadrangular prism as in the above-described embodiment (see FIG. 1) and a lower surface outer peripheral portion 5I may serve as the buckle-side engaging portion as it is. In this case, a method for storing the buckle portion 5A in the buckle storing portion 40D of the engaging portion 40 and a detachment preventing method may be the same as described for the above-described third embodiment.

In the binding member 5 according to each embodiment described above, the buckle portion 5A and the belt portion 5B are integrated with each other. However, the buckle portion 5A and the belt portion 5B may be separate from each other. For example, the binding member 5 may bind a wire routing material such that the both ends of the belt portion are inserted in the buckle portion 5A.

DESCRIPTION OF THE REFERENCE CHARACTERS 1 engaging member
10 binding structure of wire routing material
2 wire routing material
5 binding member
5A buckle portion
5B belt portion
4 body member
40 engaging portion
40A elastic latch piece
40B pillar portion
40C contact portion
40D buckle storing portion

What is claimed is:

1. An engaging member comprising:
a binding member having a belt portion that winds around an outer periphery of an elongated wire routing material, and a buckle portion capable of receiving the belt portion from a leading end thereof and fixing the belt portion;
a body member that is separate from the binding member, the body member including an engaging portion that has a pillar portion to be inserted in a fixing hole of a vehicle body for assembly into the vehicle body, and an elastic latch piece that is inserted, together with the pillar portion, in the fixing hole, is elastically deformed so as to approach the pillar portion when inserted, is elastically restored in the inserted state, is latched by and against a peripheral portion of the fixing hole in a direction opposite to an insertion direction, and enter a detachment preventing state, wherein:
the pillar portion has a buckle storing portion that can be engaged with the buckle portion by storing the buckle portion inside,
the buckle portion has a belt insertion portion through which the belt portion is inserted, and
the buckle storing portion has a main storing portion for storing the buckle portion, and a projection end storing portion capable of storing the leading end, of the belt portion, which has been inserted through the belt insertion portion of the buckle portion toward a back side in the insertion direction in the main storing portion.

2. The engaging member according to claim 1, wherein by allowing the buckle portion to enter the buckle storing portion along the same direction as the insertion direction, the buckle portion is configured to engage with the buckle storing portion.

3. The engaging member according to claim 1, wherein
the buckle portion is shaped as a quadrangular prism so as to have a belt insertion portion through which the belt portion is inserted, and the buckle portion has a buckle-side engaging portion on an outer surface other than surfaces in which an insertion inlet and an insertion outlet of the belt insertion portion are formed, and
the buckle storing portion has, on an inner wall surface, a storage-side engaging portion that engages with the buckle-side engaging portion.

4. An engaging member comprising:
a binding member having a belt portion that winds around an outer periphery of an elongated wire routing material, and a buckle portion capable of receiving the belt portion from a leading end thereof and fixing the belt portion;
a body member that is separate from the binding member, the body member including an engaging portion that has a pillar portion to be inserted in a fixing hole of a vehicle body for assembly into the vehicle body, and an elastic latch piece that is inserted, together with the pillar portion, in the fixing hole, is elastically deformed so as to approach the pillar portion when inserted, is elastically restored in the inserted state, is latched by and against a peripheral portion of the fixing hole in a direction opposite to an insertion direction, and enter a detachment preventing state, wherein
the pillar portion has a buckle storing portion that can be engaged with the buckle portion by storing the buckle portion inside,
the buckle portion has a belt insertion portion through which the belt portion is inserted, and a buckle-side engaging portion is provided on an outer peripheral portion of the buckle portion, and
the buckle storing portion is provided with a storage-side engaging portion that locks with the buckle-side engaging portion on an opening outer peripheral portion to prevent the buckle portion from coming off from the inside of the buckle storing portion.

* * * * *